US012370584B2

United States Patent
Mcginnis et al.

(10) Patent No.: US 12,370,584 B2
(45) Date of Patent: Jul. 29, 2025

(54) METHODS AND SYSTEMS FOR IMPROVING WATER USAGE IN FOOD PROCESSING

(71) Applicant: SMARTWASH SOLUTIONS, LLC, Salinas, CA (US)

(72) Inventors: Christopher Michael Mcginnis, Salinas, CA (US); Greg Rolsky, Carmel Valley, CA (US); James M. Brennan, Pleasanton, CA (US); Eric Child Wilhelmsen, Milpitas, CA (US)

(73) Assignee: SMARTWASH SOLUTIONS, LLC, Salinas, CA (US)

( * ) Notice: Subject to any disclaimer, the term of this patent is extended or adjusted under 35 U.S.C. 154(b) by 188 days.

(21) Appl. No.: 18/350,317

(22) Filed: Jul. 11, 2023

(65) Prior Publication Data
US 2024/0017306 A1 Jan. 18, 2024

Related U.S. Application Data

(60) Provisional application No. 63/388,938, filed on Jul. 13, 2022.

(51) Int. Cl.
*B08B 13/00* (2006.01)
*B08B 3/02* (2006.01)
(Continued)

(52) U.S. Cl.
CPC ............... *B08B 13/00* (2013.01); *B08B 3/02* (2013.01); *B08B 3/04* (2013.01); *G05D 9/12* (2013.01); *B08B 2203/027* (2013.01)

(58) Field of Classification Search
CPC .. B08B 3/02; B08B 13/00; B08B 3/04; B08B 2203/027; G05D 9/12
See application file for complete search history.

(56) References Cited

U.S. PATENT DOCUMENTS

| 4,844,106 A | 7/1989 | Hunter et al. |
| 6,112,429 A * | 9/2000 | Mitchell ................... F26B 5/08 34/236 |

(Continued)

FOREIGN PATENT DOCUMENTS

| CN | 109275926 A | 1/2019 |
| CN | 113180262 A | 7/2021 |

(Continued)

OTHER PUBLICATIONS

International Search Report and Written Opinion dated Oct. 31, 2023, corresponding Application No. PCT/US2023/070029.

*Primary Examiner* — Benjamin L Osterhout
(74) *Attorney, Agent, or Firm* — Patterson + Sheridan, LLP

(57) ABSTRACT

Methods and apparatus for improving water usage in food processing are provided. One example food processing system generally includes a wash tank for containing at least a portion of first wash water and a water sprayer configured to spray a quantity of second wash water on a food product being removed from the wash tank, wherein at least a portion of the quantity of the second wash water sprayed by the water sprayer enters the wash tank and becomes the first wash water. One example method for managing wash water in such a food processing system generally includes determining a usable quantity (and/or quality) of the first wash water in the wash tank and automatically controlling a flow rate of the second wash water for supplying to the water sprayer based on the determined usable quantity (and/or quality) of the first wash water.

27 Claims, 9 Drawing Sheets

(51) Int. Cl.
  *B08B 3/04*   (2006.01)
  *G05D 9/12*   (2006.01)

(56) References Cited

U.S. PATENT DOCUMENTS

| | | |
|---|---|---|
| 10,939,697 B2 | 3/2021 | Brennan et al. |
| 2004/0022908 A1* | 2/2004 | Kanaya .................... A23B 9/30 |
| | | 99/536 |
| 2007/0137678 A1* | 6/2007 | Bertolini ................ A23N 12/02 |
| | | 134/67 |
| 2015/0157034 A1* | 6/2015 | McEntire, Jr. ......... B65G 27/34 |
| | | 99/534 |
| 2015/0246358 A1 | 9/2015 | Benedetti |
| 2016/0021903 A1* | 1/2016 | Dull ....................... A23B 7/155 |
| | | 426/532 |
| 2017/0156390 A1 | 6/2017 | Brennan et al. |
| 2017/0156391 A1* | 6/2017 | Brennan ................ B08B 3/042 |
| 2017/0156392 A1* | 6/2017 | Brennan ................ A23N 12/02 |
| 2018/0093901 A1 | 4/2018 | Brennan et al. |

FOREIGN PATENT DOCUMENTS

| | | | |
|---|---|---|---|
| KR | 20180010412 A | 1/2018 | |
| WO | WO-2010045362 A2 * | 4/2010 | ............ A23L 1/0011 |

* cited by examiner

METHODS AND SYSTEMS FOR IMPROVING WATER USAGE IN FOOD PROCESSING

CLAIM OF PRIORITY UNDER 35 U.S.C. § 119

The present application for Patent claims benefit of U.S. Provisional Patent Application Ser. No. 63/388,938, filed Jul. 13, 2022, which is assigned to the assignee hereof and hereby expressly incorporated by reference herein.

BACKGROUND

Technical Field

Apparatus and methods of the present disclosure relate to food processing and, more particularly, to improving water usage in food processing, such as sanitization.

Description of the Related Art

The origins of washing food are lost in antiquity. The removal of soil and other materials improves the palatability and safety of many food products. The art and science related to washing food is much evolved from simple rinsing in natural waters. Today there are many approaches to managing the chemistry and application of water to food products. These varied approaches remove undesirable materials and may prevent cross contamination.

The addition of chemical agents and mechanical agitation enhances the effectiveness of wash systems. The addition of chemical agents and mechanical agitation also permits water reuse. Early wash systems relied on dilution to mitigate hazards. Modern wash systems use various chemistries including sanitizers like chlorine and peroxy acids to allow water recirculation. Water has been largely considered inexpensive and has been used freely to provide washed products, but increasingly the costs of water, the costs of used water disposal, and the costs of energy have prompted increased focus on water use.

Increased cost makes it desirable to reduce water usage. Unfortunately, wash systems are dynamic and typically involve multiple adjustments to achieve balance while still effectively cleaning food products. Most approaches to achieving balance use more water and therefore incur greater costs. Achieving true balance and optimizing water use involve overcoming several problems.

Accordingly, improving water usage in food processing is desirable.

SUMMARY

The systems, methods, and apparatus of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include decreased water usage, reduced chemical additive usage in the water, decreased expense resulting from the decreased water usage, and/or improved food safety.

Certain aspects of the present disclosure provide a method for managing wash water in a food processing system. The food processing system includes a first wash tank for containing at least a portion of first wash water and a first water sprayer configured to spray a quantity of second wash water on a food product being removed from the first wash tank, wherein at least a portion of the quantity of the second wash water sprayed by the first water sprayer enters the first wash tank and becomes the first wash water. The method generally includes: receiving an indication of a usable quantity of the first wash water in the first wash tank; and automatically causing alteration of a first flow rate of the second wash water for supplying to the first water sprayer based on the indication of the usable quantity of the first wash water.

Certain aspects of the present disclosure provide a food processing system. The food processing system generally includes: a first wash tank for containing at least a portion of first wash water; a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; and at least one controller. The at least one controller is generally configured to: obtain an indication of a usable quantity of the first wash water in the first wash tank; and control a first flow rate of the second wash water supplied to the first water sprayer, based on the indication.

Certain aspects of the present disclosure provide a method for managing wash water in a food processing system. The food processing system generally includes a first wash tank for containing at least a portion of first wash water and a first water sprayer configured to spray a quantity of second wash water on a food product being removed from the first wash tank, wherein at least a portion of the quantity of the second wash water sprayed by the first water sprayer enters the first wash tank and becomes the first wash water. The method generally includes: receiving an indication of a quality of the first wash water in the first wash tank; and automatically causing alteration of a first flow rate of the second wash water for supplying to the first water sprayer based on the indication of the quality.

Certain aspects of the present disclosure provide a food processing system. The food processing system generally includes: a first wash tank for containing at least a portion of first wash water; a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; and at least one controller. The at least one controller is generally configured to: obtain an indication of a quality of the first wash water in the first wash tank; and control a first flow rate of the second wash water supplied to the first water sprayer, based on the indication.

Certain aspects of the present disclosure provide a method for managing wash water in a food processing system. The food processing system includes a wash tank for containing at least a portion of the wash water and a water sprayer configured to spray a quantity of the wash water on a food product. The method generally includes: detecting, with a water level sensor disposed adjacent to a lateral surface of the wash tank and above an inner bottom surface of the wash tank, a usable quantity of the wash water in the wash tank; and automatically causing alteration of a flow rate of the wash water for supplying to the water sprayer based on the detected usable quantity of the wash water.

Certain aspects of the present disclosure provide a food processing system. The food processing system generally includes: a wash tank for containing wash water; a water sprayer configured to spray a quantity of the wash water on a food product; a water level sensor disposed adjacent to a lateral surface of the wash tank and above an inner bottom surface of the wash tank, wherein the water level sensor is configured to detect a usable quantity of the wash water in the wash tank; and at least one controller configured to: obtain an indication of the usable quantity of the wash water in the wash tank from the water level sensor; and control a flow rate of the wash water supplied to the water sprayer, based on the indication.

Certain aspects of the present disclosure provide a method for modifying a processing system to manage wash water, in accordance with aspects of the present disclosure. The method generally includes: introducing at least one sensor configured to detect at least one of a usable quantity of the wash water in the first wash tank or a quality of the wash water in the first wash tank or coming out of the first wash tank; and configuring at least one controller to cause alteration of a flow rate of the wash water for supplying to the water sprayer based on the at least one of the detected usable quantity of the wash water or the detected quality of the wash water.

Certain aspects of the present disclosure provide an apparatus for food processing. The apparatus generally includes memory comprising executable instructions and one or more controllers coupled to the memory. The one or more controllers are generally configured to execute the executable instructions to cause the apparatus to obtain at least one of an indication of a usable quantity of first wash water in a wash tank or an indication of a quality of the first wash water in the wash tank and to control a flow rate of second wash water for supplying to a water sprayer for spraying on a food product being removed from the wash tank, based on the at least one of the indication of the usable quantity or the indication of the quality.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
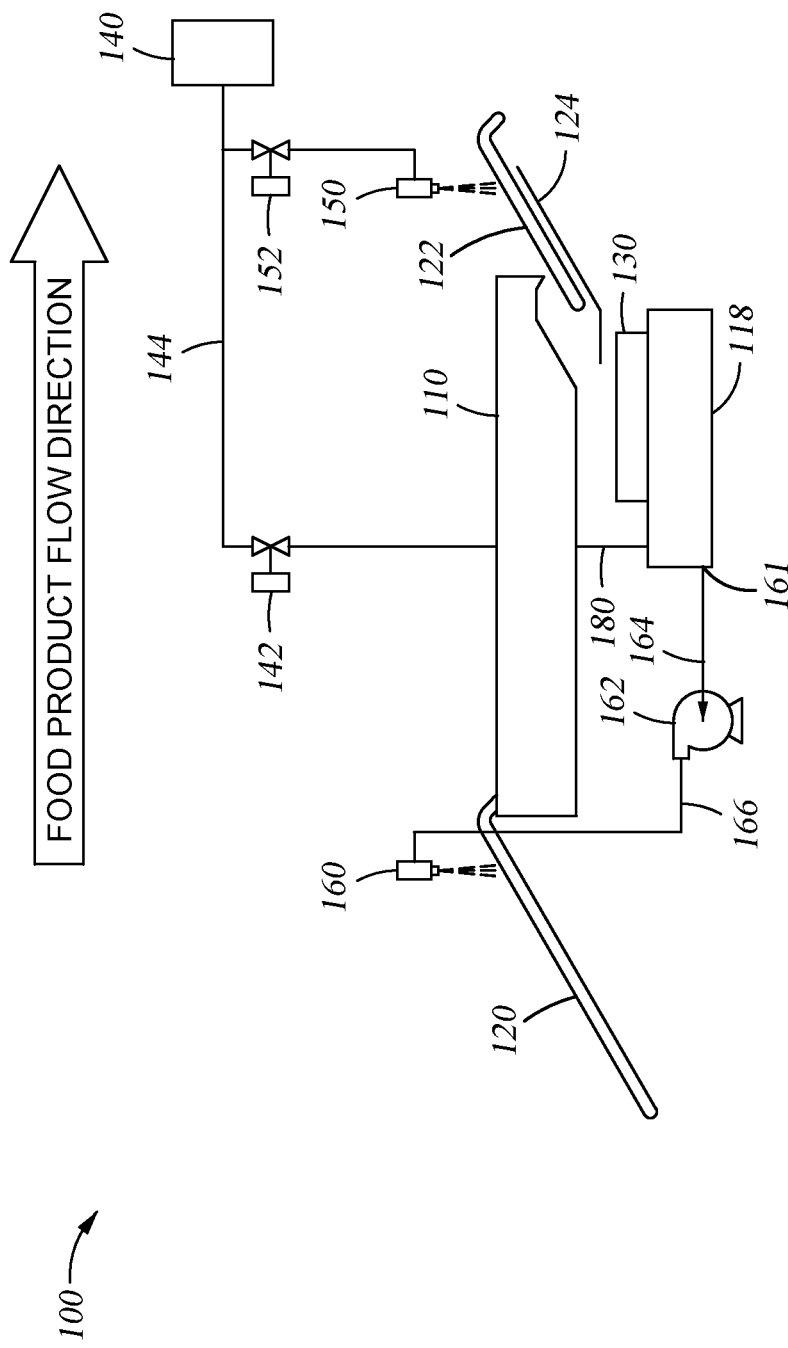
FIG. 1 is a schematic diagram of a single-stage food processing system, in accordance with previously known techniques.

Aspects of the present disclosure provide apparatus, systems, and methods for reducing water usage in food processing.

Previously known wash systems used for food processing have used chemical agents and/or mechanical agitation to enhance the effectiveness of the wash systems. The chemical agents may include sanitizers like chlorine and peroxy acids. The chemical agents may enable reuse of water already used for washing food products for washing additional food products in the wash systems. In previously known wash systems, water has been largely considered inexpensive and has been used freely to provide washed food products. Water and chemical agent usage may result in expenses for disposal of the used water and chemical agents. Additionally, the wash water may be heated or cooled, which may also result in expenses for a food processing facility. Increasingly, the costs of water, the costs of used water disposal, and the costs of energy have prompted increased focus on water use.

The present disclosure provides apparatus, systems, and methods for managing wash water in a food processing system. The provided methods include monitoring a usable quantity of the wash water in a wash tank of the food processing system and controlling flow rates to one or more water sprayers in the food processing system based on the monitored quantity. For example, when the usable quantity of the water in a wash tank of the food processing system goes below a lower threshold, a control system may increase the flow rate to a water sprayer that both adds water to the wash tank and sprays the food product after the food product is removed from the wash tank. The addition of the water increases the usable quantity of the wash water in the wash tank. In this example, the control system may additionally or alternatively decrease the flow rate to a water sprayer spraying the food product prior to the food product entering the wash tank. The water supplied to this water sprayer may be taken from the wash tank, and decreasing the flow rate to this water sprayer decreases the rate of wash water being removed from the wash tank. In the example, if the usable quantity of wash water goes above an upper threshold, then the control system may reduce the flow rate to the water sprayer that both adds water to the wash tank and sprays the food product after the food product is removed from the wash tank, and/or the control system may increase the flow rate to the water sprayer receiving water from the wash tank and spraying the food product prior to the food product entering the wash tank.

The provided methods also include monitoring a quality of the wash water in a wash tank of the food processing system and controlling flow rates to one or more water sprayers in the food processing system based on the monitored quality. For example, when the quality of the water in a wash tank of the food processing system goes below a threshold quality, a control system may increase the flow rate to a water sprayer spraying the food product prior to the food product entering the wash tank so as to increase the cleanliness of the food product before the food product enters the wash tank, thus preventing some dirt and debris from entering the wash tank with the food product. The water supplied to this water sprayer may be taken from the wash tank, resulting in the removal of low-quality wash water from the wash tank. In the example, the control system may additionally or alternatively increase the flow rate to a water sprayer that both adds higher-quality water to the wash tank and sprays the food product after the food product is removed from the wash tank. The addition of the higher-quality water improves the quality of the wash water in the wash tank.

The provided methods also include measuring a usable quantity of wash water in a wash tank with a water level sensor that is located above a bottom surface of the wash tank. The water level sensor may be positioned at or above a level of an outlet of the wash tank that is coupled to an inlet of a pump that controls a flow of water to a water sprayer.

By controlling the flow rates of water supplied to water sprayers in the food processing system based on the usable quantity of the wash water, the food processing system may reduce the total quantity of wash water used while effectively washing the food product. Similarly, by controlling the flow rates of water supplied to water sprayers in the food processing system based on the quality of the wash water, the food processing system may reduce the total quantity of wash water used while effectively washing the food product. Placing a water level sensor above the bottom of a wash tank to measure the usable quantity of the wash water in the wash tank may prevent sediments or other contaminants from fouling the water level sensor, thus improving the reliability of the water level sensor and of the food processing system utilizing the water level sensor.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

As shown and described herein, various aspects of the disclosure will be presented. Various aspects may have the same or similar features, and thus, the same or similar features may be labeled with the same reference numeral. Although similar reference numbers may be used in a generic sense, various aspects will be described and various features may include changes, alterations, modifications, etc. as would be appreciated by those of skill in the art, whether explicitly described or otherwise.

Example Food Processing Systems

Certain aspects of the present disclosure may include a food processing system for washing food products. The food processing system may wash the food products within a wash tank, although the present disclosure is not so limited and includes food processing systems using wash stages such as wash flumes (with or without an active wash area), rotating drum washers, and/or agitated tanks where air or other mechanical agitation is used to promote cleaning. Such a food processing system may also include one or more sprayers (e.g., water curtains) configured to spray the food products with wash water or rinse water before and/or after the food products are washed in the wash tank.

A food processing system may obtain water from a water source, which is generally a pressurized municipal supply, but may be any potable water source. The food processing system may add sanitizers or other chemicals to the wash water to assist with cleaning the food products. Such sanitizers may be manually added or be added by a control system that senses the wash water, determines to add chemicals, and causes the chemicals to be added to the wash water.

The food processing system may further include other elements related to food processing. Examples of these other elements include valves for controlling flow rates to water sprayers and into the wash tank, pumps for supplying water to the water sprayers, and/or a wash water cooling element, such as a chiller, to cool the wash water.

FIG. 1 is a schematic diagram of a food processing system 100 (also referred to herein as a "process line"), in accordance with previously known techniques. As illustrated in FIG. 1, the food product enters the food processing system 100 at the left, flows left-to-right through the food processing system 100, and exits the food processing system 100 at the right. Thus, the food product may be dirtiest at the left and cleanest at the right.

The food processing system 100 includes a single wash tank 110 and may be referred to as a single-tank or single-stage food processing system. The wash tank 110 may also be referred to as the "active wash area." A water source 140 (also referred to as a "water supply") supplies potable water to the food processing system 100.

The food processing system 100 further includes a first water sprayer 150 and a second water sprayer 160. The first water sprayer 150 is configured to spray the food product with water after the food product is removed from the wash tank 110 and may be referred to as a "final rinse water sprayer" in a single-stage processing system. The second water sprayer 160 is configured to spray the food product with water before the food product enters the wash tank 110 and may be referred to as a "pre-rinse water sprayer." The first water sprayer 150 may obtain water from the water source 140 via a pipe 144 (e.g., an overhead pipe). A valve 152, which may be manually operated, controls the flow rate of water supplied to the first water sprayer 150. The second water sprayer 160 obtains wash water from a wash tank 118 (also referred to as a "holding tank" and distinguishable from the active wash area of wash tank 110), which is in fluid communication with the wash tank 110 (e.g., via a pipe 180 or other means of conveying fluid). That is, the wash water in the wash tank 118 may freely exchange with the wash water in the wash tank 110. While wash tank 118 and wash tank 110 are shown as separate tanks, these tanks may be one continuous wash tank having the described features. The wash water from an outlet 161 in wash tank 118 is pumped by a pump 162 from the wash tank 118 via pipe 164 and to the second water sprayer 160 via pipe 166.

The food processing system 100 also includes a feed belt 120 (e.g., a conveyor belt) for adding the food product to the wash tank 110 and a removal belt 122 for removing the food product from the wash tank 110. Below the removal belt 122 may be a catch tray 124 that is configured to catch at least some of the water falling off and/or through the removal belt 122 and channel the caught water into a filter 130. Water from the catch tray 124 may pass through the filter 130, which filters the water from the catch tray 124 to prevent debris and food product from entering the wash tank 118. The filter 130 is configured so that water that passes through the filter 130 enters the wash tank 118.

When food processing in the food processing system 100 is about to commence, a valve 142 may be opened (partially or completely) to add water from the water source 140 to the wash tank 110 and ensure a desired quantity of water is in the wash tank 110. The valve 142 may be manually operated. Chemical additives (not shown) may be added to the water, concurrently with the introduction of water or after the water has been added. The water in the wash tank 110 may be referred to herein as "first wash water."

During the processing of food in the food processing system 100, food product is introduced onto the feed belt 120, which transfers the food product into the wash tank 110. Before the food product enters the wash tank 110, the food product is rinsed with first wash water sprayed from the second water sprayer 160 (and which came from the wash tank 118). The food product is washed in the wash tank 110, after which, the food product is removed from the wash tank 110 via the removal belt 122. Food product on the removal belt 122 is rinsed with second wash water (e.g., rinse water) sprayed by the first water sprayer 150. Some first wash water is conveyed with the food product when the food product is removed from the wash tank 110. The second wash water from the first water sprayer 150 rinses off the first wash water from the food product on the removal belt 122 and mixes with the first wash water, and at least some of the mixture of second wash water and first wash water may land on the catch tray 124. The mixture of second wash water and first wash water from the catch tray 124 may be filtered through the filter 130 and enter the wash tank 118, mixing with and becoming first wash water in the wash tank 118. As mentioned above, the wash tank 118 is in fluid communication with the wash tank 110, so the first wash water in the wash tank 118 may be used for washing food product in the wash tank 110.

Water levels in the wash tanks 110 and 118 may be controlled by partially or fully opening and/or closing (e.g., an operator of the food processing system 100 manually opening or closing) one or more of the valves 142 and 152. For example, if an operator of the food processing system 100 notes that a water level in the wash tanks 110 and 118 is lower than desired (e.g., by observing the water level or observing a low tank alarm sounding), then the operator may manually open the valve 142 to add water or to increase a rate at which water is added to the wash tanks 110 and 118. In another example, if the operator of the food processing system 100 notes that a water level in the wash tanks 110 and 118 is higher than desired (e.g., water is overflowing from wash tank 110 and/or wash tank 118), the operator may partially close valve 152 to slow a rate at which water from the first water sprayer 150 is sprayed on the food product on the removal belt 122 and subsequently enters the wash tank 118 via the catch tray 124 and filter 130.

Figure 2:
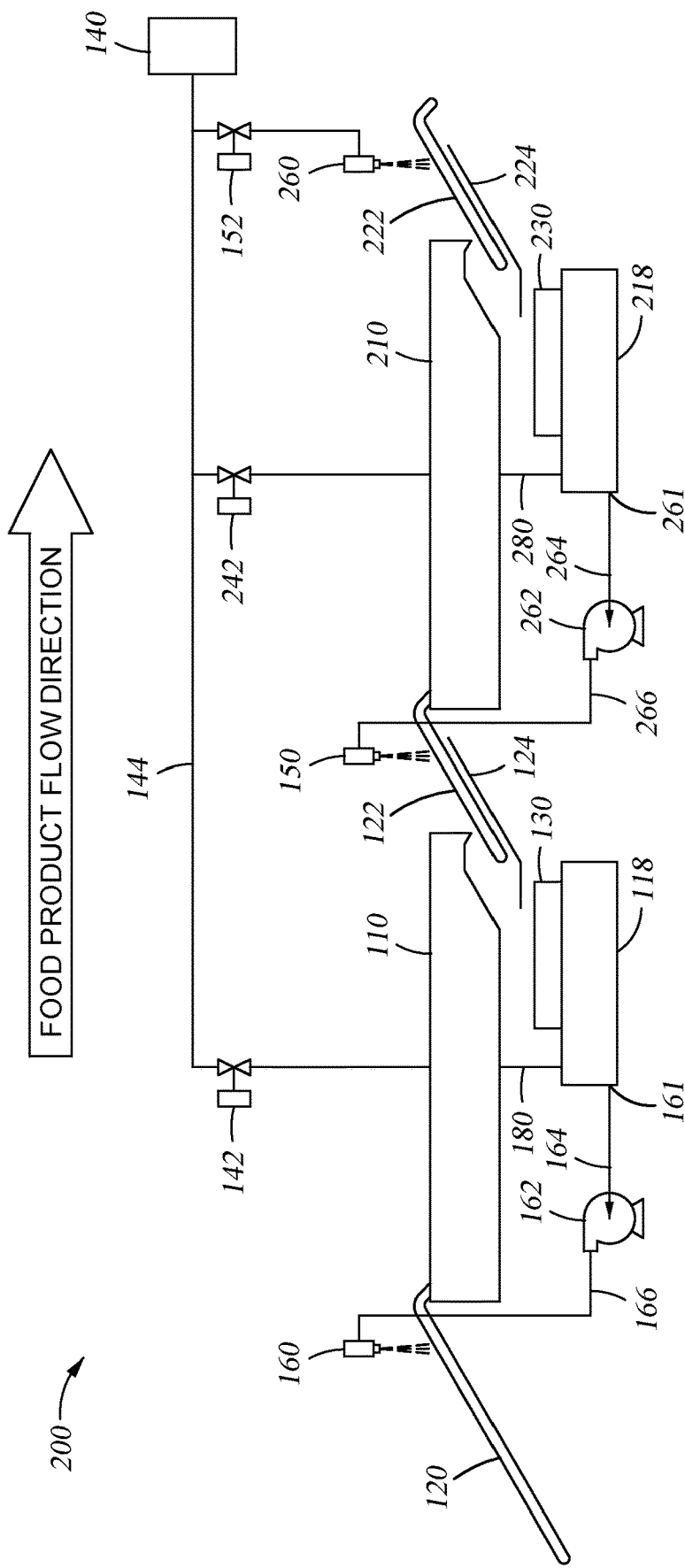
FIG. 2 is a schematic diagram of a two-stage food processing system, in accordance with previously known techniques.

FIG. 2 is a schematic diagram of a food processing system 200 (also referred to herein as a "process line"), in accordance with previously known techniques. Many of the components of the food processing system 200 are identical to components of the food processing system 100 (shown in FIG. 1) and are not further described. As illustrated in FIG. 2, the food product enters the food processing system 200 at the left, flows left-to-right through the food processing system 200, and exits the food processing system 200 at the right. Thus, the food product may be dirtiest at the left and cleanest at the right.

The food processing system 200 includes two wash tanks 110 and 210 and may be referred to as a two-tank or two-stage food processing system. Wash tank 110 may be referred to as a "primary wash tank" or "primary wash stage," and wash tank 210 may be referred to as a "secondary wash tank" or "secondary wash stage." The water in the primary wash tank 110 may be referred to as "first wash water." The water in the secondary wash tank 210 may be referred to as "second wash water."

The food processing system 200 includes a third water sprayer 260 configured to spray the food product with water after the food product is removed from the secondary wash tank 210 and may be referred to as a "final rinse water sprayer" in a two-stage processing system. The third water sprayer 260 obtains third wash water (e.g., rinse water) from the water source 140, and water from this water source is controlled by the valve 152. In the food processing system 200, the first water sprayer 150 receives second wash water from wash tank 218 (also referred to as a "holding tank"), which is in fluid communication with the secondary wash tank 210 (e.g., via a pipe 280). That is, the second wash water in the wash tank 218 may freely exchange with the second wash water in the secondary wash tank 210. While wash tank 218 and wash tank 210 are shown as separate tanks, these tanks may be one continuous wash tank having the described features. Second wash water from an outlet 261 in the wash tank 218 may be pumped by a pump 262 from the wash tank 218 via pipe 264 and to the first water sprayer 150 via pipe 266. The first water sprayer 150 may be referred to as a "separation zone water curtain" in a two-stage food processing system.

The removal belt 122 (also referred to as a "transfer belt") is configured to remove the food product from the primary wash tank 110 and add the food product to the secondary wash tank 210. An additional removal belt 222 may be configured to remove the food product from the secondary wash tank 210. Below the removal belt 222 may be disposed a catch tray 224 that is configured to catch at least some of the water falling off and/or through the removal belt 222 and channel the caught water into a filter 230. Water from the catch tray 224 may pass through the filter 230, which filters the water from the catch tray 224 to prevent debris and food product from entering the wash tank 218. The filter 230 is configured so that water that passes through the filter 230 enters the wash tank 218.

When food processing in the food processing system 200 is about to commence, a valve 242 may be opened to add water from the water source 140 to the secondary wash tank 210 and ensure a desired quantity of water is in the secondary wash tank 210. The valve 242 may be manually operated. Chemical additives (not shown) may be added to the water.

During the processing of food in the food processing system 200, food product is introduced onto the feed belt 120, which transfers the food product into the primary wash tank 110. Before the food product enters the primary wash tank 110, the food product is rinsed and/or treated with first wash water sprayed from the second water sprayer 160. The food product is washed in the primary wash tank 110, after which the food product is removed from the primary wash tank 110 via the removal belt 122. Food product on the removal belt 122 is rinsed and/or treated with second wash water sprayed by the first water sprayer 150. Some first wash water may be conveyed with the food product when the food product is removed from the first wash tank 110. The second wash water from the first water sprayer 150 rinses off the first wash water from the food product on the removal belt 122 and may mix with the first wash water, and at least some of the mixture of the second wash water and the first wash water may land on the catch tray 124. The mixture of second wash water and first wash water from the catch tray 124 may be filtered through the filter 130 and enter the wash tank 118, mixing with and becoming first wash water in the wash tank 118.

Also during the processing of food in the food processing system 200, food product on the removal belt 122 (i.e., food product removed from the primary wash tank 110) is transferred into the secondary wash tank 210. Before the food product enters the secondary wash tank 210, the food product is rinsed and/or treated with second wash water sprayed from the first water sprayer 150. The food product is washed in the secondary wash tank 210, after which the food product is removed from the secondary wash tank 210 via the removal belt 222. Food product on the removal belt 222 is rinsed with rinse water sprayed by the third water sprayer 260. Some second wash water may be conveyed with the food product when the food product is removed from the secondary wash tank 210. The rinse water from the third water sprayer 260 rinses off the second wash water from the food product on the removal belt 222 and mixes with the second wash water, and at least some of the mixture of the second wash water and the rinse water may land on the catch tray 224. The mixture of second wash water and rinse water from the catch tray 224 may be filtered through the filter 230 and enter the wash tank 218, mixing with and becoming second wash water in the wash tank 218.

Water levels in the wash tanks 110, 118, 210, and 218 may be controlled by partially or fully opening and/or closing (e.g., an operator of the food processing system 200 manually opening or closing) one or more of the valves 142, 152, and 242. For example, if an operator of the food processing system 200 notes that a water level in the wash tanks 110 and 118 is lower than desired (e.g., the operator observes a low tank alarm for the primary wash stage sounding), then the operator may manually open the valve 142 to add water or to increase a rate at which water is added to the wash tanks 110 and 118. In another example, if the operator of the food processing system 200 notes that a water level in the wash tanks 210 and 218 is higher than desired (e.g., the operator observes that water is overflowing from wash tank 210 and/or wash tank 218), the operator may partially close valve 152 to slow a rate at which water from the third water sprayer 260 is sprayed on the food product on the removal belt 222 and subsequently enters the wash tank 218 via the catch tray 224 and filter 230.

While the food processing system 200 is shown having two wash stages (i.e., the primary wash stage and the secondary wash stage), it is to be understood by the reader that multi-stage food processing systems may have more than two stages. Such multi-stage food processing systems may include an additional water sprayer (e.g., similar to the first water sprayer 150, second water sprayer 160, or third water sprayer 260) for each additional wash stage, so that there is typically one more water sprayer than the number of wash stages in such multi-stage food processing systems. The water sprayers may be configured to spray the food product before the food product enters the primary wash stage, after the food product is removed from the final wash stage, and between each wash stage.

Example Food Processing Systems with Automated Wash Water Control

When many previously known food processing systems were designed and implemented, water was largely considered inexpensive and those food processing systems typically used water freely to provide washed food products. Increasingly, the costs of water, the costs of used water disposal, and the costs of energy have prompted increased focus on water use by food processing systems. These increasing costs make it desirable to optimize or at least improve water usage by food processing systems.

Food processing systems are dynamic and typically involve multiple adjustments to achieve balance. Balance in a food processing system is frequently achieved by using more water, which typically results in the food processing system using more water than strictly necessary to process the food product. This water usage increases the expense of operating the food processing system, of course. In manually controlled food processing systems (e.g., food processing systems 100 and 200, shown in FIGS. 1 and 2), the multiple manual adjustments to achieve balance result in the food processing system having an extra labor expense (for the operator making the adjustments) and typically result in the food processing system using excess water, as the operator's adjustments may be delayed and/or may not be optimized for water usage.

Figure 3:
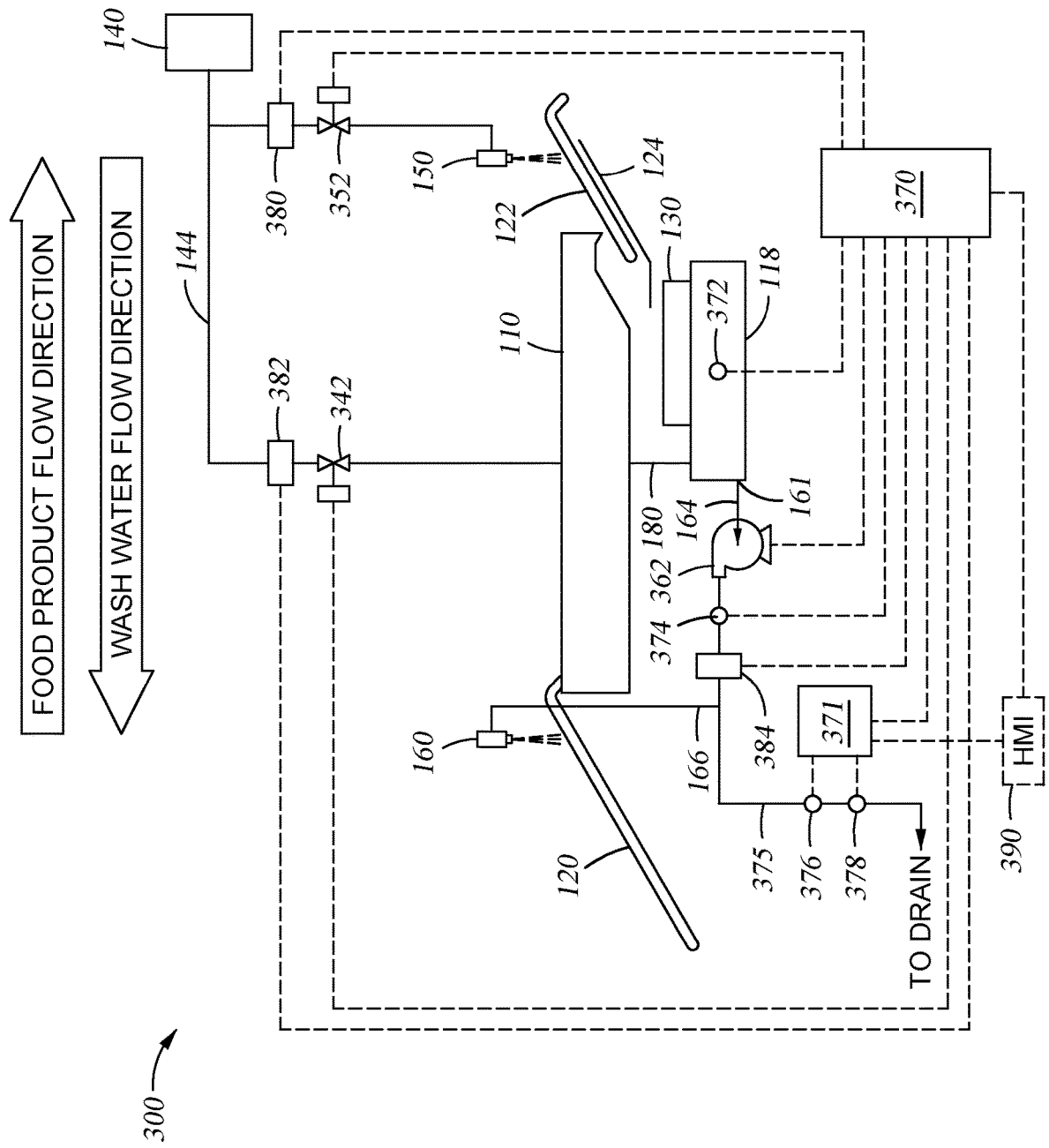
FIG. 3 is a schematic diagram of a single-stage food processing system, in accordance with certain aspects of the present disclosure.

FIG. 3 is a schematic diagram of a food processing system 300 (also referred to herein as a "process line"), in accordance with aspects of the present disclosure. Many of the components of the food processing system 300 are identical to components of the food processing system 100 (shown in FIG. 1) and are not further described. As illustrated in FIG. 3, the food product conceptually enters the food processing system 300 at the left, flows left-to-right through the food processing system 300, and exits the food processing system 300 at the right. Thus, the food product may be dirtiest at the left and cleanest at the right. In contrast, the wash water (e.g., the second wash water and the first wash water) may enter the food processing system 300 from the right, may flow right-to-left through the food processing system 300, and may exit the food processing system 300 at the left (e.g., a counter flow of wash water compared to the flow of the food product). The quality of the wash water may match the dirtiness of the food product. In other words, the highest quality (e.g., cleanest) wash water may be present at the right in the food processing system 300, and the lowest quality wash water may be present at the left in the food processing system 300.

The food processing system 300 includes a control system (which may include one or more controllers, which are represented by a controller 370) that is configured to automatically control and independently modulate the spraying of the first wash water and the second wash water in the food processing system 300, as well as the addition of water to the food processing system 300. The food processing system further includes valves 352 and 342 (e.g., solenoid valves), a pump 362 (e.g., a variable speed pump), and flow meters 380, 382, and 384. The food processing system also includes at least one of a water level sensor 372 and a water quality sensor 374. The water level sensor 372 may be a density-based sensor or a pressure sensor, for example. The controller 370 may be optionally communicatively coupled to any or a combination of: the valves 352 and 342; the pump 362; the flow meters 380, 382, and 384; the water level sensor 372; and the water quality sensor 374, for example, via wires and/or optical fibers, as symbolized by the dashed lines in FIG. 3. Optionally, the controller 370 may wirelessly (e.g., via Wi-Fi or Bluetooth®) exchange signals with any or a combination of: the valves 352 and 342; the pump 362; the flow meters 380, 382, and 384; the water level sensor 372; and the water quality sensor 374.

The valve 352 is configured to control a flow rate of second wash water (e.g., rinse water) supplied to the first water sprayer 150 from the water source 140. Control of the valve 352 may be implemented via a control signal from the controller 370, as shown. The flow meter 380 is configured to measure the flow rate of water supplied to the first water sprayer 150 and provide the measurement(s) to the controller 370. Similarly, the valve 342 is configured to control a flow rate of water from the water source 140 into the wash tank 110, and the flow meter 382 is configured to measure the flow rate of water supplied to the wash tank 110 and provide the measurement(s) to the controller 370. Control of the valve 342 may be implemented via a control signal from the controller 370, as shown.

The pump 362 is configured to control a flow rate of first wash water supplied to the second water sprayer 160. The flow meter 384 is configured to measure the flow rate of first wash water supplied to the second water sprayer 160. Control of the pump 362 may be implemented via a control signal from the controller 370, as shown.

The water level sensor 372 is configured to measure a usable quantity of first wash water in the wash tank 118 and wash tank 110, which are in fluid communication with each other (e.g., via pipe 180) or may be the same wash tank. The water level sensor 372 is configured to measure the water level (e.g., as indicated by pressure) of the first wash water in the wash tank 118 and provide the measurement to the controller 370. The water level sensor 372 may be positioned, for example, adjacent to a lateral surface of the wash tank 118 and above a bottom surface of the wash tank 118. By placing the water level sensor 372 higher than the bottom surface of the wash tank 118, debris and sediment from the first wash water are prevented from settling on the water level sensor 372, and thus the reliability of the water level sensor 372 is improved over previously known water level sensors that were placed on the bottom surface of the wash tank 118 to measure total water level. For example, the water level sensor 372 may be placed above (or in some cases even with) a level of the outlet 161 from the wash tank 118. The first wash water in the wash tank 118 that is at or above the outlet 161 can be pumped from the wash tank 118 to the second water sprayer 160 (via pipes 164, 166) and is therefore referred to as "usable first wash water." The first wash water in the wash tank 118 that is below the outlet 161 cannot be pumped from the wash tank 118 to the second water sprayer 160 and is therefore not referred to as usable. In this manner, the water level sensor 372 may effectively measure the usable level of first wash water, rather than the total water level in the wash tank.

The water quality sensor 374 is configured to measure a quality of the first wash water and provide (indications of) the measurements to the controller 370. In some aspects, the water quality sensor 374 is an optical sensor (e.g., an ultraviolet (UV) or a visible light sensor) that measures the optical density of the first wash water. Such an optical sensor may transmit an optical signal into, for example, a window in a pipe containing the first wash water, and the optical sensor may sense a reflection of the optical signal to measure the quality of the first wash water. Such an optical sensor may utilize light having wavelengths in a range from 260 nm to 280 nm, for example. These wavelengths are useful for assessing the remaining utility of wash water in a chlorine-based wash system. While the water quality sensor 374 is illustrated as being on the pipe 166 via which first wash water is supplied to the second water sprayer 160, the present disclosure is not so limited, and the water quality sensor 374 may be placed at any location where the water quality sensor 374 can access the first wash water (e.g., in the wash tank 110 or in the wash tank 118). The water quality sensor 374 may be configured to measure the purity, pH, additive (e.g., chlorine) concentration, clarity, and/or turbidity of the first wash water.

The control system (as represented by the controller 370) may be a computer, a processor, a processing system, a programmable logic controller (PLC), or any other type of programmable system. Although a system of relays and analog controls may act as the controller 370, a PLC will typically be more effective. A PLC may afford the opportunity to use integrating control and anticipate changes. In certain aspects, the control system may utilize a trained machine learning model. An optional human-machine interface (HMI) 390 may be provided to facilitate interactions with one or more operators of the food processing system 300 and provide real-time feedback regarding the status of the tanks, water quality, and flow rates of each of the water sprayers. An HMI or other interface may also facilitate interactions with the product feed system (e.g., the feed belt 120 and the removal belt 122) and an optional wash solution control system that controls adding chemicals to the wash water. A PLC may also provide the ability to report process line status to enable remote monitoring of the food processing system 300.

The food processing system may optionally include a system for controlling a wash solution in a wash system for food processing, such as the system(s) described in U.S. Pat. App. No. 2018/0093901 A1 to Brennan et al., filed Oct. 3, 2017, which is incorporated by reference herein in its entirety. The system for controlling the wash solution in the food processing system may include a wash solution controller 371 (e.g., an Automated SmartWash Analytical Platform (ASAP)™ from SmartWash Solutions, LLC of Salinas, California), a chlorine sensor 376, and a pH sensor 378. The wash solution controller 371 may be configured to control addition of chlorine and/or wash solution to the first wash water, based on a detected chlorine concentration and/or pH of the first wash water. The wash solution controller 371 may be optionally communicatively coupled to one or more of the chlorine sensor 376, the pH sensor 378, the controller 370, and the HMI 390, for example, via wires and/or optical fibers, as symbolized by the dashed lines in FIG. 3. Optionally, the wash solution controller 371 may wirelessly exchange signals with one or more of the chlorine sensor 376, the pH sensor 378, the controller 370, and the HMI 390. Alternatively, the wash solution controller 371 may not be present, and the controller 370 may perform the functions of the wash solution controller 371.

As used herein, a processing or control system may include a memory comprising instructions and one or more processors (e.g., controller 370 and/or wash solution controller 371) configured to execute the instructions and cause the processor(s) to perform or direct performance of operations as described herein.

The chlorine sensor 376 is configured to measure the chlorine concentration of the first wash water in a pipe 375 and to report the chlorine concentration measurement to the wash solution controller 371. The pipe 375 is coupled with pipe 166 and may connect with a drain (as shown) or with one or more other pipes and/or tanks to cause water in the pipe 375 to be recycled in the food processing system 300 (e.g., by being reintroduced into the pipe 166 or at the second water sprayer 160). The pH sensor 378 is configured to measure the pH of the first wash water in the pipe 375 and to report the measured pH to the wash solution controller 371.

The controller 370 may be configured to obtain measurements (or indications thereof) of water flow rates from flow meters 380, 382, and 384; measurements (or indications thereof) of the usable quantity of first wash water from the water level sensor 372; measurements (or indications thereof) of the quality of the first wash water from the water quality sensor 374; and/or measurements (or indications thereof) of chlorine concentration of the first wash water from the chlorine sensor 376. The controller 370 may be further configured to control the operation of the valves 342 and 352 and the pump 362. The controller 370 may also be configured to determine whether the feed belt 120 is running.

When food processing in the food processing system 300 is about to commence, the controller 370 may cause the valve 342 to open to add water from the water source 140 to the wash tank 110. The controller 370 receives measurements (or indications thereof) of flow rates in the pipe 144 from the flow meter 382, and in certain cases, may calculate the total quantity of water added to the wash tank (e.g., by multiplying the measured flow rate(s) by the interval(s) over which the water is flowing) and may control recording of the quantity of water added to the wash tank 110 (e.g., by storing in memory). The controller 370 may also receive measurements (or indications thereof) of the water level in the wash tank 118 from the water level sensor 372 (if present) and determine the quantity of usable wash water that is in the wash tank 110 and the wash tank 118 (which are in fluid communication or may be the same wash tank). When the controller determines a desired quantity of usable wash water is in the wash tank 110 and the wash tank 118 based on one or more of the measurements (or indications thereof) from the flow meter 382 and the water level sensor 372, the controller 370 may cause the valve 342 to be closed.

The controller 370 may also be configured to calculate the quantity of water added to the food processing system 300 based on measurements (or indications thereof) of the flow rates received from the flow meters 380 and 382. The controller 370 may calculate separate quantities of water added to the food processing system 300 before food processing begins and water added during food processing. The controller 370 may record and/or report the quantities of water added to the food processing system 300.

During the processing of food in the food processing system 300, the controller 370 may determine whether the feed belt 120 is running. The controller 370 may, for example, be configured with or coupled to a sensor that detects motion of the feed belt, be configured with or coupled to a sensor that detects that electrical power is supplied to a motor of the feed belt, have direct control (e.g., via a solenoid switch) of electricity supplied to the feed belt, or receive an input from an operator of the food processing system that the feed belt is running. When the controller 370 determines that the feed belt 120 is running, the controller 370 may send a signal to the valve 352 to begin supplying second wash water (e.g., rinse water) to the first water sprayer 150. When the controller 370 determines that the feed belt 120 is running, the controller 370 may also send a signal to the pump 362 to begin supplying first wash water to the second water sprayer 160. The controller 370 may be configured to cause a flow rate of second wash water to the first water sprayer 150 to initially be approximately equal to a flow rate of first wash water to the second water sprayer 160, so that the food processing system 300 begins operating with approximately equal rates of water being added to the food processing system 300 (via the first water sprayer 150) and water being removed from the food processing system 300 (via the second water sprayer 160, the water of which may be disposed of after being sprayed on the food product on the feed belt 120).

The controller 370 may be configured to monitor the flow rate of the second wash water supplied to the first water sprayer 150 based on signals from the flow meter 380. The controller 370 may be further configured to send signals to the valve 352 to alter the flow rate of the second wash water supplied to the first water sprayer 150 in order to keep the flow rate within a desired range while the processing of food product in the food processing system 300 is occurring.

The controller 370 may be further configured to monitor the flow rate of the first wash water supplied to the second water sprayer 160 based on signals from the flow meter 384. The controller 370 may be configured to send control signals to the pump 362 to alter the flow rate of the first wash water supplied to the second water sprayer 160 in order to keep the flow rate within a desired range while the processing of food in the food processing system 300 is occurring.

Also during the processing of food in the food processing system 300, if the food processing system includes the water level sensor 372, the controller 370 may monitor the usable quantity of first wash water in the wash tank 110 and the wash tank 118 and send signals to control the valve 352 to alter the flow rate of second wash water supplied to the first water sprayer 150, based on the detected usable quantity of first wash water. By doing so, the controller 370 may act to keep the usable quantity of first wash water in a desired range. The controller 370 may use a proportional-integral-derivative (PID) control algorithm to control the flow rate of second wash water supplied to the first water sprayer 150 to keep the usable quantity of first wash water in the desired range. The controller 370 may be configured to cause the valve 352 to increase the flow rate of the second wash water to the first water sprayer 150, when the usable quantity of first wash water in the wash tanks 110 and 118 is less than a first threshold amount. The controller 370 may also be configured to cause the valve 352 to decrease the flow rate of the second wash water to the first water sprayer 150, when the usable quantity of first wash water in the wash tanks 110 and 118 is greater than a third threshold amount. By doing so, the controller can prevent water from being used inefficiently (e.g., by unnecessarily overfilling the wash tanks 110 and 118).

The controller 370 may be further configured to cause the valve 342 to open and add water from the water source 140 to the wash tank 110, when the usable quantity of first wash water in the wash tanks 110 and 118 is less than a second threshold amount that is less than the first threshold amount. For example, the controller 370 may be configured to detect a low tank alarm (e.g., by detecting an electrical signal to the alarm) for the wash tank 110 and cause the valve 342 to open in response to detecting the low tank alarm. By so doing, the controller can quickly make up a loss of first wash water in the wash tanks 110 and 118. However, adding water from the water source 140 to the wash tank 110 is less desirable than adding water via the first water sprayer 150 (and catch tray 124 and filter 130), as adding water from the water source 140 to replenish water in the wash tank 110 violates the goal of counter-flow washing and may not make for the most effective use of water in the food processing system 300.

The controller 370 may also be configured to control the pump 362 to alter the flow rate of first wash water to the second water sprayer 160, based on the detected usable quantity of first wash water. By doing so, the controller 370 may act to keep the usable quantity of first wash water in a desired range. The controller 370 may be configured to cause the pump 362 to decrease the flow rate of the first wash water to the second water sprayer 160 when the usable quantity of first wash water in the wash tanks 110 and 118 is less than a fourth threshold amount, which may be the same as or different from the first or second threshold amount. Decreasing the flow rate of the first wash water to the second water sprayer 160 is more desirable than adding water via the first water sprayer 150 to the wash tank 110, as at least a portion of the wash water sent to the second water sprayer 160 may be disposed of (e.g., sent down a drain) and no longer available to wash the food product in the wash tank 110. The controller 370 may also be configured to cause the pump 362 to increase the flow rate of the first wash water to the second water sprayer 160, when the usable quantity of first wash water in the wash tanks 110 and 118 is greater than a fifth threshold amount, which may be the same as or different from the third threshold amount.

If the food processing system 300 includes the water quality sensor 374, then the controller 370 may be configured to monitor the quality of the first wash water and to send signals to control the valve 352 to alter the flow rate of second wash water supplied to the first water sprayer 150, based on the detected quality of the first wash water. By doing so, the controller 370 may act to keep the quality of the first wash water in a desired range. The controller 370 may use a PID control algorithm to control the flow rate of second wash water supplied to the first water sprayer 150 to keep the quality of the first wash water in the desired range. The controller 370 may be configured to cause the valve 352 to increase the flow rate of the second wash water to the first water sprayer 150 when the quality of the first wash water is less than a first threshold quality. The controller 370 may also be configured to cause the valve 352 to decrease the flow rate of the second wash water to the first water sprayer 150, when the quality of the first wash water is greater than a second threshold quality.

If the food processing system 300 includes the water quality sensor 374, then the controller 370 may be further configured to monitor the quality of the first wash water and to send signals to control the valve 342 to open and add water from the water source 140 to the wash tank 110, when the quality of first wash water in the wash tanks 110 and 118 is less than a third threshold quality that is less than the first threshold quality. By doing so, the controller 370 may act to quickly improve the quality of the first wash water and keep the quality of the first wash water in a desired range. As above, adding water from the water source 140 to the wash tank 110 is less desirable than adding water via the first water sprayer 150 (and catch tray 124 and filter 130), as the water from the water source 140 is higher quality than the water in the wash tank 110, and the water is used more efficiently by first using the water to rinse the food product being removed from the wash tank 110 before reusing the water to wash the food product in the wash tank 110.

During operation of the food processing system 300, the controller 370 (acting as the wash solution controller 371) or the wash solution controller 371 may obtain measurements of the chlorine concentration in the first wash water and cause chlorine to be added to the first wash water so that the chlorine concentration of the first wash water remains in a desired range in order for the first wash water to effectively clean the food product. The wash solution controller 371 may, for example, cause a controlled amount of a concentrated sodium hypochlorite (NaOCl) solution to be added to the first wash water. During operation of the food processing system 300, the wash solution controller 371 (if present) may obtain indications of measurements of the pH in the first wash water and cause an additive (e.g., an acidic additive, such as citric acid, lactic acid, phosphoric acid, or a wash adjuvant such as SmartWash® or SmartWash® Organic (SWO), available from SmartWash Solutions, LLC of Salinas, California) to be added to the first wash water so that the pH of the first wash water remains in a desired range (e.g., 4 to 6.5) in order for the first wash water to effectively clean the food product.

If, during operation of the food processing system 300, either the chlorine concentration or the pH of the first wash water goes out of its respective desired range, then the wash solution controller 371 may cause the food processing system 300 to stop processing the food product by, e.g., stopping the feed belt 120. In such cases, the wash solution controller 371 may also or alternatively activate a visual alarm (e.g., a red light) and/or an audible alarm (e.g., a klaxon). The wash solution controller 371 may also send a signal to the controller 370 to stop the flow of water to the first and second water sprayers 150 and 160. Alternatively, the controller 370 may cause stopping the flow of water to the first and second water sprayers 150 and 160 in response to the feed belt 120 stopping in response to the command from the wash solution controller 371.

During operation of the food processing system 300, if the food processing system includes the wash solution controller 371, the wash solution controller 371 may be configured to send a signal to the controller 370 regarding a water flow rate for the food processing system 300. The wash solution controller 371 may detect that the first wash water has a high chlorine demand, which may be associated with a high concentration of organic material in the first wash water. In such a case, it may be more economical to dilute out the organic material in the first wash water by adding second wash water (e.g., rinse water) than to increase the chlorine to meet the chlorine demand, and so the wash solution controller 371 may be configured to send a signal to the controller 370 requesting an increase in water flow rates in the food processing system 300. The controller 370 may respond to that signal by sending one or more control signals to the valve 352 and/or the pump 362 to increase the respective flow rates of second wash water to the first water sprayer 150 and/or first wash water to the second water sprayer 160. By increasing these one or more flow rates, the first wash water and its high concentration of organic material may be rapidly removed from the food processing system 300 via the second water sprayer 160 while the food processing continues.

Alternatively, if the food processing system includes the wash solution controller 371, the wash solution controller 371 may be configured to send a signal to the controller 370 regarding chlorine demand of the first wash water. If the chlorine demand of the first wash water is high, the controller 370 may be configured to cause an increase of water flow rates in the food processing system 300. As above, the controller 370 may cause an increase of the water flow rates in the food processing system 300 by sending control signals to the valve 352 and the pump 362 to increase the respective flow rates of second wash water to the first water sprayer 150 and first wash water to the second water sprayer 160.

As described above, the controller 370 may be configured to control the valve 352 to alter the flow rate of second wash water supplied to the first water sprayer 150, based on the detected usable quantity of first wash water, the detected quality of the first wash water, and/or a signal from the wash solution controller 371 (if present). In some cases, at least two of the detected usable quantity of first wash water, the detected quality of the first wash water, and the signal from the wash solution controller 371 may conflict on whether to increase or decrease the flow rate of second wash water supplied to the first water sprayer 150. For example, the controller 370 may normally determine to decrease the flow rate of second wash water supplied to the first water sprayer 150 based on the detected usable quantity of first wash water being greater than the third threshold amount, but the controller 370 may normally determine to increase the flow rate of second wash water supplied to the first water sprayer 150 based on the quality of the first wash water being less than a first threshold quality, all other considerations aside.

In some aspects of the present disclosure, the controller 370 may be configured to resolve a conflict of indications (e.g., the conflict described above) of how to alter the flow rate of second wash water supplied to the first water sprayer 150 by favoring increasing the flow rate of second wash water supplied to the first water sprayer 150. That is, if the controller 370 determines to increase the flow rate of second wash water supplied to the first water sprayer 150 based on any of the detected usable quantity of first wash water, the detected quality of the first wash water, or the signal from the wash solution controller 371 (if present), then the controller 370 may cause the flow rate of second wash water supplied to the first water sprayer 150 to increase, regardless of other indications to decrease the flow rate of second wash water supplied to the first water sprayer 150.

In some aspects of the present disclosure, the controller 370 may be configured to resolve a conflict of indications (e.g., the conflict described above) of how to alter the flow rate of second wash water supplied to the first water sprayer 150 by favoring a determination based on the detected usable quantity of first wash water. That is, if the controller 370 makes a determination to alter (i.e., increase or decrease) the flow rate of second wash water supplied to the first water sprayer 150 based on the detected usable quantity of first wash water, then the controller 370 may cause the determined alteration of flow rate of second wash water supplied to the first water sprayer 150, regardless of other indications to increase or decrease the flow rate of second wash water supplied to the first water sprayer 150. In such cases, if the controller 370 does not determine to alter the flow rate of second wash water supplied to the first water sprayer 150 based on the detected usable quantity of first wash water, then the controller 370 may make a determination to alter the flow rate of second wash water supplied to the first water sprayer 150 based on the detected quality of the first wash water, and/or a signal from the wash solution controller 371 (if present).

If the feed belt 120 stops running (e.g., the supply of food product is interrupted) once processing of food product in the food processing system 300 has started, then the controller 370 may act to stop the flow of second wash water to the first water sprayer 150 and to stop the flow of first wash water to the second water sprayer 160. The controller 370 may, for example, control the valve 352 to stop the flow of water from the water source 140 to the first water sprayer 150. The controller 370 may also, for example, control the pump 362 to stop pumping first wash water to the second water sprayer 160. By stopping the flow of second wash water to the first water sprayer 150 and the flow of first wash water to the second water sprayer 160, the controller 370 may reduce water usage in the food processing system 300 as compared to previously known processing systems (e.g., food processing system 100, shown in FIG. 1).

By altering the flow rates of the first water sprayer 150 and the second water sprayer 160 in response to the usable quantity and/or the quality of the wash water in the wash tanks 110 and 118, the controller 370 may reduce water usage (i.e., use water more efficiently) in the food processing system 300 as compared to previously known processing systems (e.g., food processing system 100, shown in FIG. 1). Using water more efficiently may decrease the expenses involved with operation of the food processing system 300. These expenses may include expenses to purchase the water, expenses for disposal of the used water, and expenses for heating or cooling the water.

Figure 4:
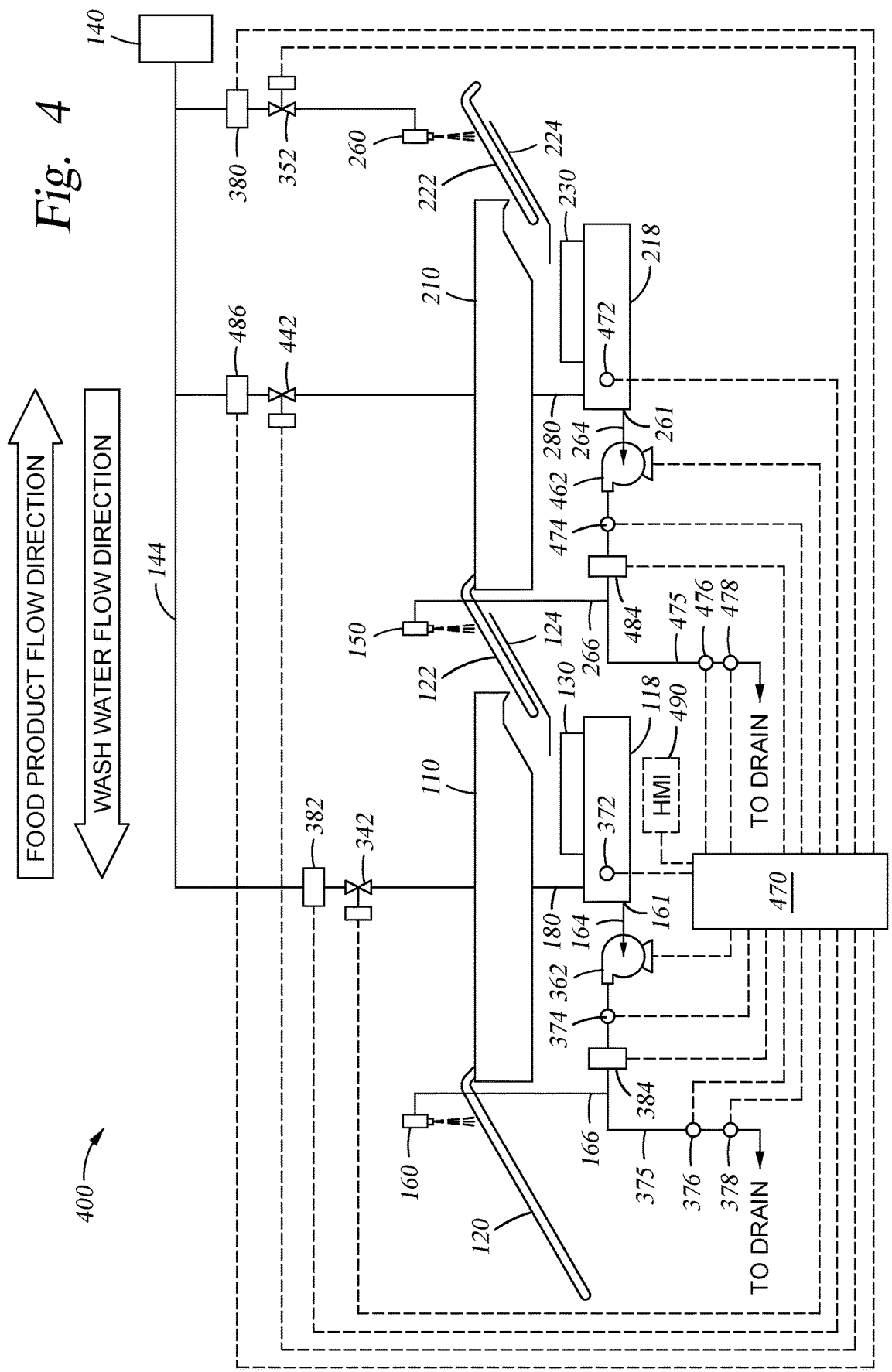
FIG. 4 is a schematic diagram of a two-stage food processing system, in accordance with certain aspects of the present disclosure.

FIG. 4 is a schematic diagram of a food processing system 400 (also referred to herein as a "process line"), in accordance with aspects of the present disclosure. Many of the components of the food processing system 400 are identical to components of the food processing systems 100 (shown in FIG. 1), 200 (shown in FIG. 2), and 300 (shown in FIG. 3) and are not further described. As illustrated in FIG. 4, the food product enters the food processing system 400 at the left, flows left-to-right through the food processing system 400, and exits the food processing system 400 at the right. Thus, the food product may be dirtiest at the left and cleanest at the right. In contrast, the wash water (e.g., the first wash water, the second wash water, and the third wash water) may enter the food processing system 400 from the right, may flow right-to-left through the food processing system 400, and may exit the food processing system 400 at the left (e.g., a counter flow of wash water compared to the flow of food product). The quality of the wash water may match the dirtiness of the food product. In other words, the highest quality (e.g., cleanest) wash water may be present at the right in the food processing system 400, and the lowest quality wash water may be present at the left in the food processing system 400.

The food processing system 400 includes a control system (which may include one or more controllers, which are represented by a controller 470) that is configured to automatically control and independently modulate the spraying of the first wash water, the second wash water, and the third wash water in the food processing system 400, as well as the addition of water to the food processing system 400. The food processing system 400 further includes a valve 442 (e.g., a solenoid valve), a pump 462 (e.g., a variable speed pump), and flow meters 484 and 486. The food processing system 400 also includes at least one of a water level sensor 372, a water level sensor 472, a water quality sensor 374, and a water quality sensor 474. Either or both of the water level sensors 372, 472 may be density-based or pressure sensors, for example. The controller 470 may be optionally communicatively coupled to any or a combination of: the valves 342, 352, and 442; the pumps 362 and 462; the flow meters 380, 382, 384, and 484; the water level sensors 372 and 472; an optional HMI 490; and the water quality sensors 374 and 474 via wires and/or optical fibers, as symbolized by the dashed lines in FIG. 4. Optionally, the controller 470 may wirelessly (e.g., via Wi-Fi or Bluetooth®) exchange signals with any or a combination of: the valves 342, 352, and 442; the pumps 362 and 462; the flow meters 380, 382, 384, and 484; the water level sensors 372 and 472; the HMI 490; and the water quality sensors 374 and 474.

The valve 442 is configured to control a flow rate of water from the water source 140 into the secondary wash tank 210, and the flow meter 486 is configured to measure the flow rate of water supplied to the secondary wash tank 210 and provide the measurement(s) to the controller 470. Control of the valve 442 may be implemented via a control signal from the controller 470, as shown.

The pump 462 is configured to control a flow rate of second wash water supplied to the first water sprayer 150. The flow meter 484 is configured to measure the flow rate of second wash water supplied to the first water sprayer 150. Control of the pump 462 may be implemented via a control signal from the controller 470, as shown.

The water level sensor 472 is configured to measure a usable quantity of second wash water in the wash tank 218 and wash tank 210 (which are in fluid communication with each other or may be the same wash tank). The water level sensor 472 is configured to measure the water level (e.g., as indicated by pressure) of the second wash water in the wash tank 218 and provide the measurement to the controller 470. Similar to the water level sensor 372, the water level sensor 472 may be positioned, for example, adjacent to a lateral surface of the wash tank 218 and above a bottom surface of the wash tank 218. In this manner, debris and sediment from the second wash water may be prevented from settling on the water level sensor 472, and thus, the reliability of the water level sensor 472 is improved over previously known water level sensors placed on the bottom surface of the wash tank 218 to measure total water level. For example, the water level sensor 472 may be placed above (or in some cases even with) a level of the outlet 261 from the wash tank 218. The second wash water in the wash tank 218 that is at or above the outlet 261 can be pumped from the wash tank 218 to the first water sprayer 150 (via pipes 264, 266) and is therefore referred to as "usable second wash water." The second wash water in the wash tank 218 that is below the outlet 261 cannot be pumped from the wash tank 218 to the first water sprayer 150 and is therefore not referred to as usable. In this manner, the water level sensor 472 may effectively measure the usable level of second wash water, rather than the total water level in the wash tank.

The water quality sensor 474 is configured to measure a quality of the second wash water and provide indications of the measurements to the controller 470. In some aspects, the water quality sensor 474 is an optical sensor (e.g., an ultraviolet (UV) sensor or a visible light sensor) that measures the optical density of the first wash water. Such an optical sensor may transmit an optical signal into, for example, a window in a pipe containing the first wash water, and the optical sensor may sense a reflection of the optical signal to measure the quality of the first wash water. Such an optical sensor may utilize light having wavelengths in a range from 260 nm to 280 nm, for example. These wavelengths are useful for assessing the remaining utility of wash water in a chlorine-based wash system. While the water quality sensor 474 is illustrated as being on the pipe 266 via which second wash water is supplied to the first water sprayer 150, the present disclosure is not so limited, and the water quality sensor 474 may be placed at any location where the water quality sensor 474 can access the second wash water (e.g., in the wash tank 210 or in the wash tank 218). As with the water quality sensor 374, the water quality sensor 474 may be configured to measure the purity, pH, additive (e.g., chlorine) concentration, clarity, and/or turbidity of the second wash water.

The control system of FIG. 4 (as represented by the controller 470) is similar to the control system of FIG. 3 and may be a computer, a processor, a processing system, a PLC, or any other type of programmable system. Although a system of relays and analog controls may act as the controller 470, a PLC will typically be more effective. A PLC may afford the opportunity to use integrating control and anticipate changes. An optional HMI 490 may be provided to facilitate interactions with one or more operators of the food processing system 400 and provide real-time feedback regarding the status of the tanks, water quality, and flow rates of each of the water sprayers. The HMI 490 or other interface may also facilitate interactions with the product feed system (e.g., the feed belt 120 and the removal belts 122 and 222) and/or an optional wash solution control system that controls adding chemicals to the wash water. A PLC may also provide the ability to report process line status to enable remote monitoring of the food processing system 400.

The food processing system 400 may optionally include a system for controlling a wash solution in a wash system for food processing, such as the system(s) described in U.S. Pat. App. No. 2018/0093901 A1 to Brennan et al., filed Oct. 3, 2017. The controller 470 may incorporate the functions of a wash solution controller (e.g., an Automated SmartWash Analytical Platform (ASAP)™ from SmartWash Solutions, LLC of Salinas, California) of the system for controlling the wash solution in the food processing system. Alternatively, the controller 470 may represent both one or more controllers for the food processing system and one or more separate wash solution controllers (not shown in FIG. 4, but similar to the wash solution controller 371 of FIG. 3) communicatively coupled with each other. The system for controlling the wash solution in the food processing system may include a first chlorine sensor 376, a first pH sensor 378, a second chlorine sensor 476, and a second pH sensor 478. The controller 470 and/or the wash solution controller(s) (not shown) may be configured to control addition of chlorine and/or wash solution to the first wash water, based on a detected chlorine concentration and/or pH of the first wash water. The controller 470 and/or the wash solution jcontroller(s) may be further configured to control addition of chlorine and/or wash solution to the second wash water, based on a detected chlorine concentration and/or pH of the second wash water. The controller 470 and/or the wash solution controller(s) may be optionally communicatively coupled to one or more of the first chlorine sensor 376, the first pH sensor 378, the second chlorine sensor 476, and the second pH sensor 478, for example, via wires and/or optical fibers, as symbolized by the dashed lines in FIG. 4. Optionally, the controller 470 and/or the wash solution controller(s) may wirelessly exchange signals with one or more of the first chlorine sensor 376, the first pH sensor 378, the second chlorine sensor 476, and the second pH sensor 478.

The chlorine sensor 476 is configured to measure the chlorine concentration of the second wash water in a pipe 475 and to report the chlorine concentration measurement to the controller 470 or the wash solution controller (e.g., via an indication of the chlorine concentration measurement in a signal). The pipe 475 is coupled with pipe 266 and may connect with a drain (as shown) or with one or more other pipes and/or tanks to cause water in the pipe 475 to be recycled in the food processing system 400 (e.g., by being reintroduced into the pipe 266 or at the first water sprayer 150). The pH sensor 478 is configured to measure the pH of the second wash water in the pipe 475 and to report the measured pH to the controller 470 and/or the wash solution controller(s).

The controller 470 may be configured to obtain measurements (or indications thereof) of water flow rates from flow meters 380, 382, 384, 484, and 486; measurements (or indications thereof) of the usable quantity of first wash water from the water level sensor 372; measurements (or indications thereof) of the usable quantity of second wash water from the water level sensor 472; measurements (or indications thereof) of the quality of the first wash water from the water quality sensor 374; and/or measurements (or indications thereof) of the quality of the second wash water from the water quality sensor 474. The controller 470 may be further configured to control the operation of the valves 342, 352, and/or 442. The controller 470 may be further configured to control the operation of the pumps 362 and/or 462. The controller 470 may also be configured to determine whether the feed belt 120, the removal belt 122, and/or the removal belt 222 are running.

When food processing in the food processing system 400 is about to commence, the controller 470 may cause the valves 342 and/or 442 to open to add water from the water source 140 to the wash tanks 110 and/or 210, respectively. The controller 470 may receive (indications of) measurements from the flow meters 382 and 486, and in certain cases, may calculate the total quantity of water added to the wash tanks (e.g., by multiplying the measured flow rate(s) by the interval(s) over which the water is flowing) and may control recording of the quantities of water added to the wash tanks 110 and 210 (e.g., by storing in memory). The controller 470 may also receive (indications of) measurements from the water level sensors 372 and/or 472 (if present), determine the quantity of usable first wash water that is in the wash tank 110 and the wash tank 118 (which are in fluid communication or may be the same wash tank), and/or determine the quantity of usable second wash water that is in the wash tank 210 and the wash tank 218 (which are in fluid communication or may be the same wash tank). When the controller 470 determines a desired quantity of usable first wash water is in the wash tanks 110 and 118 based on one or more of the measurements from the flow meter 382 and the water level sensor 372, the controller 470 may cause the valve 342 to be closed. When the controller 470 determines a desired quantity of usable second wash water is in the wash tanks 210 and 218 based on one or more of the measurements from the flow meter 486 and the water level sensor 472, the controller 470 may cause the valve 442 to be closed.

The controller 470 may also be configured to calculate the quantity of water added to the food processing system 400 based on (indications of) measurements of the flow rates received from the flow meters 380, 382, and 486. The controller 470 may calculate separate quantities of water added to the food processing system 400 before food processing begins and water added during food processing. The controller 470 may record and/or report the quantities of water added to the food processing system 400.

During the processing of food in the food processing system 400, the controller 470 may determine whether the feed belt 120, the removal belt 122, and/or the removal belt 222 are running. The controller 470 may, for example, be configured with one or more sensors that detect motion of the feed belt 120, the removal belt 122, and/or the removal belt 222; be configured with one or more sensors that detect that electrical power is supplied to one or more motors of the feed belt 120, the removal belt 122, and/or the removal belt 222; have direct control (e.g., via a solenoid switch) of electricity supplied to the feed belt 120, the removal belt 122, and/or the removal belt 222; or receive one or more inputs from an operator of the food processing system indicating that the feed belt 120, the removal belt 122, and/or the removal belt 222 are running. When the controller 470 determines that the feed belt 120, the removal belt 122, and/or the removal belt 222 are running, the controller 470 may send one or more signals to the valve 352 to begin supplying second wash water (e.g., rinse water) to the third water sprayer 260. Also, when the controller 470 determines that the feed belt 120, the removal belt 122, and/or the removal belt 222 are running, the controller 470 may send signals to the pump 362 to begin supplying first wash water to the second water sprayer 160 and to the pump 462 to begin supplying second wash water to the first water sprayer 150.

The controller 470 may be configured to cause a flow rate of first wash water to the second water sprayer 160 to initially be approximately equal to a flow rate of second wash water to the first water sprayer 150 and to a flow rate of third wash water to the third water sprayer 260. In this manner, the food processing system 400 may begin operating with approximately equal rates of water being added to the primary wash tank 110 (via the first water sprayer 150), water being removed from the primary wash tank (via the second water sprayer 160), water being added to the secondary wash tank (via the third water sprayer 260), and water being removed from the secondary wash tank (via the first water sprayer 150).

The controller 470 may be configured to monitor the flow rate of the second wash water supplied to the first water sprayer 150 based on signals from the flow meter 484. The controller 470 may be further configured to send signals to the pump 462 to alter the flow rate of the second wash water supplied to the first water sprayer 150 in order to keep the flow rate within a desired range while the processing of food in the food processing system 400 is occurring.

The controller 470 may be further configured to monitor the flow rate of the first wash water supplied to the second water sprayer 160 based on signals from the flow meter 384. The controller 470 may be configured to send signals to the pump 362 to alter the flow rate of the first wash water supplied to the second water sprayer 160 in order to keep the flow rate within a desired range while the processing of food in the food processing system 400 is occurring.

The controller 470 may be configured to monitor the flow rate of the rinse water supplied to the third water sprayer 260 based on signals from the flow meter 380. The controller 470 may be further configured to send signals to the valve 352 to alter the flow rate of the rinse water supplied to the third water sprayer 260 in order to keep the flow rate within a desired range while the processing of food in the food processing system 400 is occurring.

Also during the processing of food in the food processing system 400, if the food processing system includes the water level sensor 372, the controller 470 may monitor the usable quantity of first wash water in the wash tank 110 and the wash tank 118 and send signals to control the pump 462 to alter the flow rate of second wash water supplied to the first water sprayer 150, based on the detected usable quantity of first wash water. The controller 470 may use a PID control algorithm to control the flow rate of second wash water supplied to the first water sprayer 150 to keep the usable quantity of first wash water in a desired range. By doing so, the controller 470 may act to keep the usable quantity of first wash water in the desired range. The controller 470 may be configured to cause the pump 462 to increase the flow rate of the second wash water to the first water sprayer 150, when the usable quantity of first wash water in the wash tanks 110 and 118 is less than a first threshold amount. The controller 470 may also be configured to cause the pump 462 to decrease the flow rate of the second wash water to the first water sprayer 150 when the usable quantity of first wash water in the wash tanks 110 and 118 is greater than a third threshold amount. By doing so, the controller can prevent water from being used inefficiently (e.g., by unnecessarily overfilling the wash tanks 110 and 118).

The controller 470 may be further configured to cause the valve 342 to open and add water from the water source 140 to the wash tank 110, when the usable quantity of first wash water in the wash tanks 110 and 118 is less than a second threshold amount that is less than the first threshold amount. For example, the controller 470 may be configured to detect a low tank alarm (e.g., by detecting an electrical signal to the alarm) for the wash tank 110 and cause the valve 342 to open in response to detecting the low tank alarm. By so doing, the controller 470 can quickly make up a loss of first wash water in the wash tanks 110 and 118. However, adding water from the water source 140 to the wash tank 110 is less desirable than adding water via the first water sprayer 150 (and catch tray 124 and filter 130), as adding water from the water source 140 to replenish water in the wash tank 110 violates the goal of counter-flow washing and may not make for the most effective use of the water in the food processing system 400.

The controller 470 may also be configured to control the pump 362 to alter the flow rate of first wash water to the second water sprayer 160, based on the detected usable quantity of first wash water. The controller 470 may use a PID control algorithm to control the flow rate of first wash water supplied to the second water sprayer 160 to keep the usable quantity of first wash water in a desired range. By doing so, the controller 470 may act to keep the usable quantity of first wash water in the desired range. The controller 470 may be configured to cause the pump 362 to decrease the flow rate of the first wash water to the second water sprayer 160 when the usable quantity of first wash water in the wash tanks 110 and 118 is less than a fourth threshold amount, which may be the same as or different from the first or second threshold amount. Decreasing the flow rate of the first wash water to the second water sprayer 160 is more desirable than adding water via the first water sprayer 150 to the wash tank 110, as the wash water sent to the second water sprayer 160 is disposed of (e.g., sent down a drain) and no longer available to wash the food product in the wash tank 110. The controller 470 may also be configured to cause the pump 362 to increase the flow rate of the first wash water to the second water sprayer 160 when the usable quantity of first wash water in the wash tanks 110 and 118 is greater than a fifth threshold amount, which may be the same as or different from the third threshold amount.

Also during the processing of food in the food processing system 400, if the food processing system includes the water level sensor 472, the controller 470 may monitor the usable quantity of second wash water in the wash tank 210 and the wash tank 218 and send signals to control the valve 352 to alter the flow rate of rinse water supplied to the third water sprayer 260, based on the detected usable quantity of second wash water. The controller 470 may use a PID control algorithm to control the flow rate of rinse water supplied to the third water sprayer 260 to keep the usable quantity of second wash water in a desired range. By doing so, the controller 470 may act to keep the usable quantity of second wash water in the desired range. The controller 470 may be configured to cause the valve 352 to increase the flow rate of the rinse water to the third water sprayer 260 when the usable quantity of second wash water in the wash tanks 210 and 218 is less than a sixth threshold amount. The controller 470 may also be configured to cause the valve 352 to decrease the flow rate of the rinse water to the third water sprayer 260 when the usable quantity of second wash water in the wash tanks 210 and 218 is greater than an eighth threshold amount. By doing so, the controller can prevent water from being used inefficiently (e.g., by unnecessarily overfilling the wash tanks 210 and 218).

The controller 470 may be further configured to cause the valve 442 to open and add water from the water source 140 to the wash tank 210 when the usable quantity of second wash water in the wash tanks 210 and 218 is less than a seventh threshold amount that is less than the sixth threshold amount. For example, the controller 470 may be configured to detect a low tank alarm (e.g., by detecting an electrical signal to the alarm) for the wash tank 210 and cause the valve 442 to open in response to detecting the low tank alarm. By so doing, the controller 470 can quickly make up a loss of second wash water in the wash tanks 210 and 218. As above, adding water from the water source 140 to the wash tank 210 is less desirable than adding water via the third water sprayer 260 (and catch tray 224 and filter 230), as adding water from the water source 140 to replenish water in the wash tank 210 violates the goal of counter-flow washing and may not make for the most effective use of water in the food processing system 400.

The controller 470 may also be configured to control the pump 462 to alter the flow rate of second wash water to the first water sprayer 150, based on the detected usable quantity of second wash water. By doing so, the controller 470 may act to keep the usable quantity of second wash water in a desired range. The controller 470 may be configured to cause the pump 462 to decrease the flow rate of the second wash water to the first water sprayer 150 when the usable quantity of second wash water in the wash tanks 210 and 218 is less than a ninth threshold amount, which may be the same as or different from the sixth or seventh threshold amount. Decreasing the flow rate of the first wash water to the first water sprayer 150 is more desirable than adding water via the third water sprayer 260 to the wash tank 110, as the wash water sent to the first water sprayer 150 is no longer available to wash the food product in the wash tank 210. The controller 470 may also be configured to cause the pump 462 to increase the flow rate of the second wash water to the first water sprayer 150, when the usable quantity of second wash water in the wash tanks 210 and 218 is greater than a tenth threshold amount, which may be the same as or different from the eighth threshold amount.

If the food processing system 400 includes the water quality sensor 374, then the controller 470 may be configured to monitor the quality of the first wash water and to send signals to control the pump 462 to alter the flow rate of second wash water supplied to the first water sprayer 150, based on the detected quality of the first wash water. By doing so, the controller 470 may act to keep the quality of the first wash water in a desired range. The controller 470 may use a PID control algorithm to control the flow rate of second wash water supplied to the first water sprayer 150 to keep the quality of the first wash water in the desired range. The controller 470 may be configured to cause the pump 462 to increase the flow rate of the second wash water to the first water sprayer 150 when the quality of the first wash water is less than a first threshold quality. The controller 470 may also be configured to cause the pump 462 to decrease the flow rate of the second wash water to the first water sprayer 150, when the quality of the first wash water is greater than a second threshold quality. The controller 470 may also be configured to monitor the quality of the first wash water and to send signals to control the valve 352 to alter the flow rate of rinse water supplied to the third water sprayer 260, based on the detected quality of the first wash water. By doing so, the controller 470 may act to increase a flow rate of water through the food processing system 400 in order to keep the quality of the first wash water in the desired range. The controller 470 may be configured to cause the valve 352 to increase the flow rate of the rinse water to the third water sprayer 260 when the quality of the first wash water is less than the first threshold quality. The controller 470 may also be configured to cause the valve 352 to decrease the flow rate of the rinse water to the third water sprayer 260, when the quality of the first wash water is greater than the first threshold quality.

If the food processing system 400 includes the water quality sensor 374, then the controller 470 may be further configured to monitor the quality of the first wash water and to send signals to control the valve 342 to open and add water from the water source 140 to the wash tank 110, when the quality of first wash water in the wash tanks 110 and 118 is less than a third threshold quality, which is less than the first threshold quality. By doing so, the controller 470 may act to quickly improve the quality of the first wash water and keep the quality of the first wash water in the desired range. As above, adding water from the water source 140 to the wash tank 110 is less desirable than adding water via the first water sprayer 150 (and catch tray 124 and filter 130), as the water from the water source 140 is higher quality than the water in the wash tank 110, and the water is used more efficiently by first using the water to rinse the food product being removed from the wash tank 110 before reusing the water to wash the food product in the wash tank 110.

If the food processing system 400 includes the water quality sensor 474, then the controller 470 may be configured to monitor the quality of the second wash water and to send signals to control the valve 352 to alter the flow rate of rinse water supplied to the third water sprayer 260, based on the detected quality of the second wash water. By doing so, the controller 470 may act to keep the quality of the second wash water in a desired range. The controller 470 may use a PID control algorithm to control the flow rate of rinse water supplied to the third water sprayer 260 to keep the quality of the second wash water in the desired range. The controller 470 may be configured to cause the valve 352 to increase the flow rate of the rinse water to the third water sprayer 260 when the quality of the second wash water is less than a fourth threshold quality. The controller 470 may also be configured to cause the valve 352 to decrease the flow rate of the rinse water to the third water sprayer 260, when the quality of the second wash water is greater than a fifth threshold quality.

If the food processing system 400 includes the water quality sensor 474, then the controller 470 may be further configured to monitor the quality of the second wash water and to send signals to control the valve 442 to open and add water from the water source 140 to the wash tank 210, when the quality of second wash water in the wash tanks 210 and 218 is less than a sixth threshold quality, which is less than the fourth threshold quality. By doing so, the controller 470 may act to quickly improve the quality of the second wash water and keep the quality of the second wash water in a desired range. As above, adding water from the water source 140 to the wash tank 210 is less desirable than adding water via the third water sprayer 260 (and catch tray 224 and filter 230), as the water from the water source 140 is higher quality than the water in the wash tank 210, and the water is used more efficiently by first using the water to rinse the food product being removed from the wash tank 210 before reusing the water to wash the food product in the wash tank 210.

During operation of the food processing system 400, the controller 470 (acting as the wash solution controller) or the wash solution controller(s) may obtain (indications of) measurements of the chlorine concentration in the first wash water and cause chlorine to be added to the first wash water so that the chlorine concentration of the first wash water remains in a desired range in order for the first wash water to effectively clean the food product. The controller 470 and/or the wash solution controller(s) may, for example, cause a controlled amount of a concentrated sodium hypochlorite solution to be added to the first wash water. During operation of the food processing system 400, the controller 470 or the wash solution controller may obtain (indications of) measurements of the pH in the first wash water and cause an additive (e.g., an acidic additive, such as citric acid, lactic acid, phosphoric acid, or a wash adjuvant such as SmartWash® or SmartWash® Organic (SWO), available from SmartWash Solutions, LLC of Salinas, California) to be added to the first wash water so that the pH of the first wash water remains in a desired range (e.g., 4 to 6.5) in order for the first wash water to effectively clean the food product.

If, during operation of the food processing system 400, either the chlorine concentration or the pH of the first wash water goes out of its respective desired range, then the controller 470 and/or the wash solution controller(s) may cause the food processing system 400 to stop processing the food product by, e.g., stopping the feed belt 120. In such cases, the controller 470 and/or the wash solution controller(s) may also or alternatively activate a visual alarm (e.g., a red light) and/or an audible alarm (e.g., a klaxon). The controller 470 may also send one or more signals to stop the flow of water to the first and second water sprayers 150 and 160. Alternatively, the controller 470 may cause stopping of the flow of water to the first and second water sprayers 150 and 160 in response to the feed belt 120 stopping.

During operation of the food processing system 400, if the controller 470 acts as the wash solution controller, the controller 470 may be configured to cause alteration of water flow rates for the food processing system 400 in response to detecting a high chlorine demand for the first wash water. The controller 470 may detect that the first wash water has a high chlorine demand, which may be associated with a high concentration of organic material in the first wash water. In such a case, it may be more economical to dilute out the organic material in the first wash water by adding second wash water to the first wash water than to increase the chlorine to meet the chlorine demand, and so the controller 470 may be configured to send one or more control signals to the pump 462 and/or the pump 362 to increase the respective flow rates of second wash water to the first water sprayer 150 and/or first wash water to the second water sprayer 160. By increasing these one or more flow rates, the first wash water and its high concentration of organic material may be rapidly removed from the food processing system 400 via the second water sprayer 160 while the food processing continues.

During operation of the food processing system 400, if the controller 470 acts as the wash solution controller, the controller 470 may be configured to cause alteration of water flow rates for the food processing system 400 in response to detecting a high chlorine demand for the second wash water. The controller 470 may detect that the second wash water has a high chlorine demand. In some cases, it may be more economical to add rinse water than to increase the chlorine to meet the chlorine demand, and so the controller may be configured to send one or more control signals to the valve 352 and/or the pump 462 to increase the respective flow rates of rinse water to the third water sprayer 260 and/or second wash water to the first water sprayer 150. By increasing these one or more flow rates in such cases, the second wash water and the reason for its high chlorine demand may be rapidly removed from the wash tanks 210 and 218 via the first water sprayer 150 while the food processing continues.

As described above, the controller 470 may be configured to control the valve 352 to alter the flow rate of rinse water supplied to the third water sprayer 260, based on the detected usable quantity of second wash water and/or the detected quality of the second wash water, and/or the detected chlorine concentration of the second wash water, if the controller 470 acts as the wash solution controller. In some cases, at least two of the detected usable quantity of second wash water, the detected quality of the second wash water, and the detected chlorine concentration of the second wash water may conflict on whether to increase or decrease the flow rate of rinse water supplied to the third water sprayer 260. For example, the controller 470 may normally determine to decrease the flow rate of rinse water supplied to the third water sprayer 260 based on the detected usable quantity of second wash water being greater than the ninth threshold amount, but the controller 470 may normally determine to increase the flow rate of rinse water supplied to the third water sprayer 260 based on the quality of the second wash water being less than a fourth threshold quality, all other considerations aside.

In some aspects of the present disclosure, the controller 470 may be configured to resolve a conflict of indications (e.g., the conflict described above) of how to alter the flow rate of rinse water supplied to the third water sprayer 260 by favoring increasing the flow rate of rinse water supplied to the third water sprayer 260. That is, if the controller 470 determines to increase the flow rate of rinse water supplied to the third water sprayer 260 based on any of the detected usable quantity of second wash water, the detected quality of the second wash water, or the detected chlorine concentration of the second wash water, then the controller 470 may cause the flow rate of rinse water supplied to the third water sprayer 260 to increase, regardless of other indications to decrease the flow rate of rinse water supplied to the third water sprayer 260.

In some aspects of the present disclosure, the controller 470 may be configured to resolve a conflict of indications (e.g., the conflict described above) of how to alter the flow rate of rinse water supplied to the third water sprayer 260 by favoring a determination based on the detected usable quantity of second wash water. That is, if the controller 470 makes a determination to alter (i.e., increase or decrease) the flow rate of rinse water supplied to the third water sprayer 260 based on the detected usable quantity of second wash water, then the controller 470 may cause the determined alteration of flow rate of rinse water supplied to the third water sprayer 260, regardless of other indications to increase or decrease the flow rate of rinse water supplied to the third water sprayer 260. In such cases, if the controller 470 does not determine to alter the flow rate of rinse water supplied to the third water sprayer 260 based on the detected usable quantity of second wash water, then the controller 470 may make a determination to alter the flow rate of rinse water supplied to the third water sprayer 260 based on the detected quality of the second wash water, and/or the detected chlorine concentration of the second wash water.

If the feed belt 120 stops running (e.g., the supply of food product is interrupted) after processing of food product in the food processing system 400 has started, then the controller 470 may act to stop the flow of second wash water to the first water sprayer 150, the flow of first wash water to the second water sprayer 160, and the flow of rinse water to the third water sprayer 260. The controller 470 may, for example, control the valve 352 to stop the flow of water from the water source 140 to the third water sprayer 260. The controller 470 may also, for example, control the pump 362 to stop pumping first wash water to the second water sprayer 160. By stopping the flow of rinse water to the third water sprayer 260, the flow of second wash water to the first water sprayer 150, and the flow of first wash water to the second water sprayer 160, the controller 470 may reduce water usage in the food processing system 400 as compared to previously known processing systems (e.g., food processing system 200, shown in FIG. 2).

In some cases, the controller 470 may be configured to delay the stopping of the flow of first wash water to the second water sprayer 160 so that food product on the feed belt 120 is rinsed with first wash water and put into the first wash tank 110. If the food processing system 400 utilizes an intense wash treatment (e.g., as described in U.S. Published Application No. 2017/0156390 to Brennan et al., entitled "Short-Term Wash Treatment of Produce" and filed Jul. 13, 2016, herein incorporated by reference in its entirety and also known as a "short-term wash treatment") or another relatively more damaging chemical additive or wash solution concentration, it may be desirable to delay stopping the flow of first wash water to the second water sprayer 160 until all product has entered the wash tank 110. This delay may prevent the intense wash treatment or other relatively more damaging additive/concentration from damaging the food product. Depending on the food product sensitivity, it may be desirable to stagger the stopping of the flow of first wash water to the second water sprayer 160, the flow of second wash water to the first water sprayer 150, and the flow of rinse water to the third water sprayer 260 to allow food product to exit the food processing system.

By altering the flow rates of the first water sprayer 150 and the second water sprayer 160 in response to the usable quantity and/or the quality of wash water in the wash tanks 110 and 118, the controller 470 may reduce water usage (i.e., use water more efficiently) in the food processing system 400 as compared to previously known processing systems (e.g., food processing system 200, shown in FIG. 2). Using water more efficiently may decrease the expenses involved with operation of the food processing system 400. These expenses may include purchase of the water, costs for disposal of the used water, and costs for heating or cooling the water.

While the food processing system 400 is shown having two wash stages (i.e., the primary wash stage and the secondary wash stage), the present disclosure is not so limited, and aspects of the present disclosure are applicable to multi-stage food processing systems having more than two stages. Such multi-stage food processing systems may include an additional water sprayer (e.g., similar to the first water sprayer 150, second water sprayer 160, or third water sprayer 260) for each additional wash stage, so that there is typically one more water sprayer than the number of wash stages. The water sprayers are typically configured to spray the food product before the food product enters the primary wash stage and after the food product is removed from each wash stage.

In such multi-stage food processing systems, one or more controllers (e.g., a controller similar to controller 470) may be configured to control valve(s) and/or pump(s) in order to control the flow rates of wash water and/or rinse water supplied to the additional water sprayers. The controller(s) may be configured to control the flow rates supplied to the additional water sprayers based on a detected usable quantity or quantities of wash water in the wash tanks associated with any of the wash stages, similar to the operations described above with respect to the usable quantities of wash water detected by the water level sensors 372 and 472. The controller(s) may also be configured to control the flow rates supplied to the additional water sprayers based on a detected quality or qualities of wash water in the wash tanks associated with any of the wash stages, similar to the operations described above with respect to the qualities of the wash water detected by the water quality sensors 374 and 474.

Example Operations for Food Processing

Figure 5A:
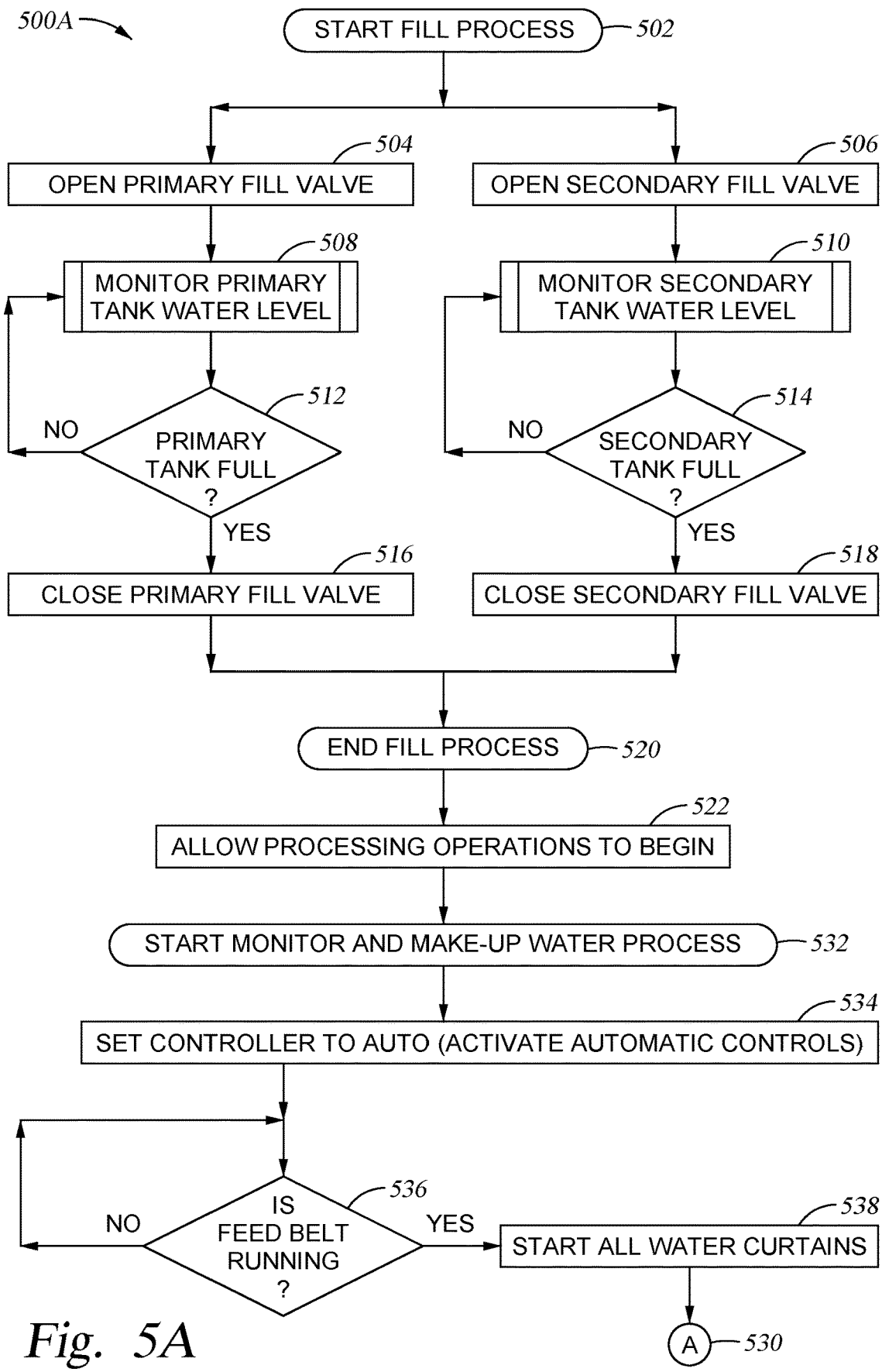
FIGS. 5A, 5B, and 5C illustrate a flow chart of an algorithm for preparing and operating a food processing system, in accordance with certain aspects of the present disclosure.
Figure 5B:
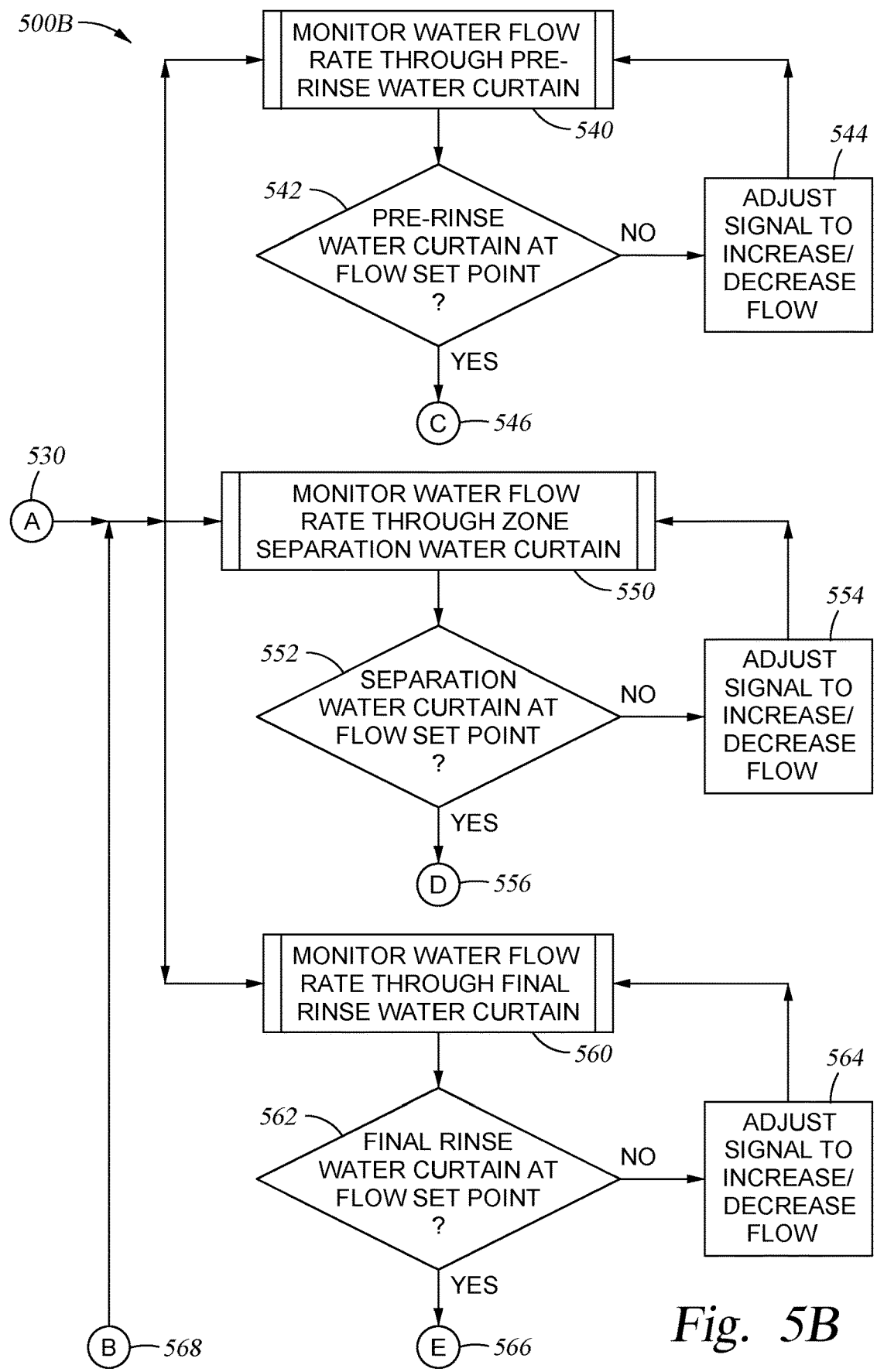
Figure 5C:
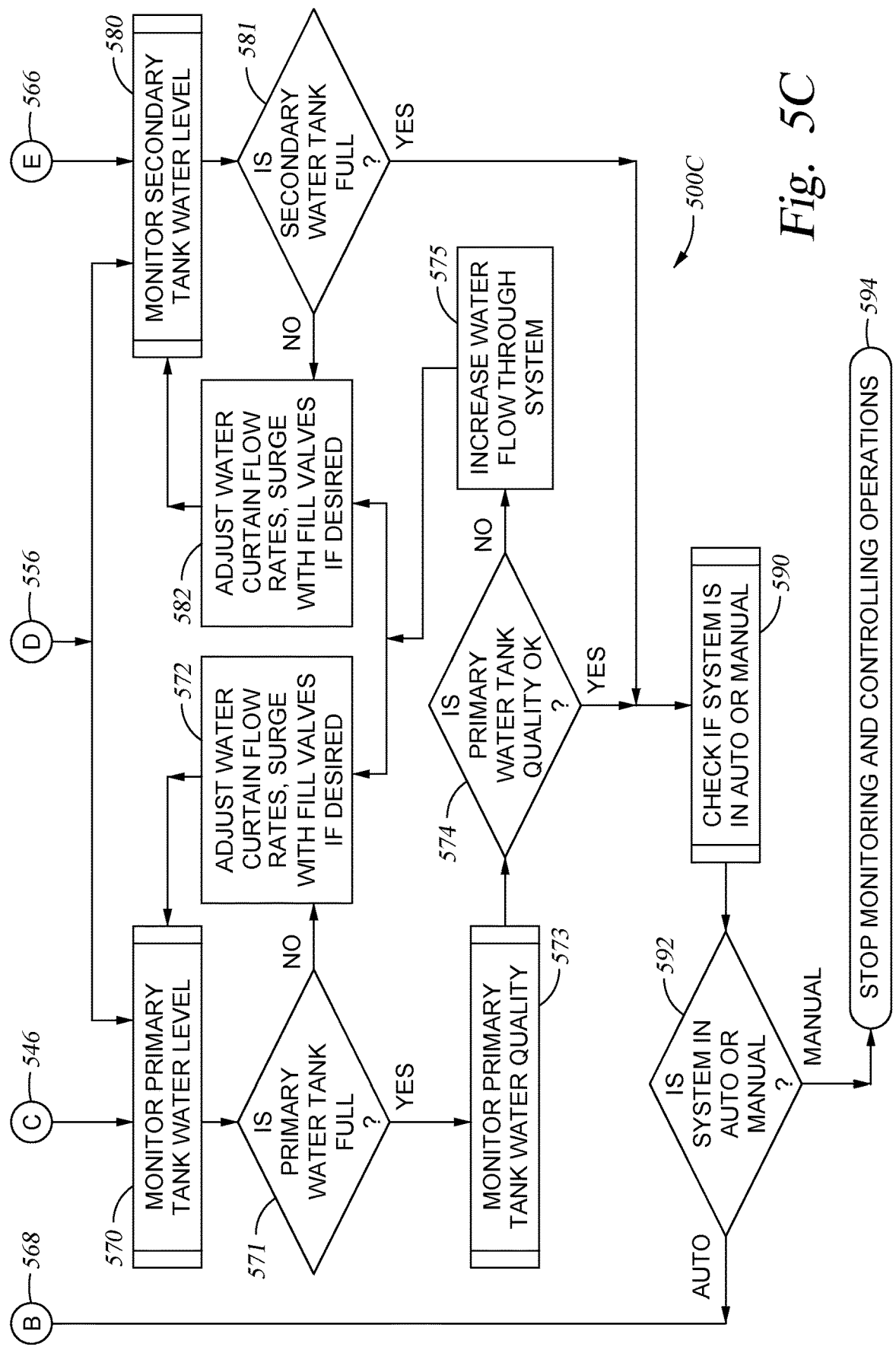

FIGS. 5A, 5B, and 5C illustrate a flow chart of an algorithm for filling and operating a food processing system, such as the food processing system 400 shown in FIG. 4, according to aspects of the present disclosure. The illustrated flow chart includes a first sub-chart 500A (shown in FIG. 5A), a second sub-chart 500B (shown in FIG. 5B), and a third sub-chart 500C (shown in FIG. 5C). The illustrated algorithm may be performed or directed by a control system, which may include one or more controllers (e.g., controller 470 shown in FIG. 4).

FIG. 5A shows the first sub-chart 500A. The portion of the algorithm shown in sub-chart 500A is a set of operations for preparing to start food processing operations, including filling wash tanks of the food processing system with wash water, according to aspects of the present disclosure. The algorithm may begin at block 502, where the control system starts the fill process for the food processing system. The control system opens the primary fill valve (e.g., valve 342 in FIG. 4) and the secondary fill valve (e.g., valve 442 in FIG. 4) at blocks 504 and 506, respectively. The primary and/or secondary fill valves may each be implemented by a solenoid valve, for example. The control system may cause the primary fill valve and the secondary fill valve to open simultaneously or sequentially.

The control system next begins executing a first sub-process for monitoring the primary tank water level (e.g., the water level in wash tank 110 in FIG. 4) at block 508 and a second sub-process for monitoring the secondary tank water level (e.g., the water level in wash tank 210 in FIG. 4) at block 510. The monitoring of the primary tank water level and the secondary tank water level may include receiving signals from flow meters (e.g., flow meters 382 and 486 in FIG. 4) and determining how much water has been added to each of the primary tank and the secondary tank. Additionally or alternatively, the monitoring of the primary tank water level and the secondary tank water level may include: (i) receiving signals from water level sensors (e.g., water level sensors 372 and 472) positioned to measure water levels of water in the primary tank and the secondary tank and (ii) determining quantities of water in the tanks, based on the indicated water levels. At decision block 512, the control system determines whether the primary tank is full (or holds a target quantity of water). If the primary tank is not full (or does not hold the target quantity of water), then the algorithm proceeds from block 512 to block 508. If the primary tank is full (or holds the target quantity), then the algorithm proceeds from block 512 to block 516. At decision block 514, the control system determines whether the secondary tank is full (or holds a target quantity of water). If the secondary tank is not full (or does not hold the target quantity of water), then the algorithm proceeds from block 514 to block 510. If the secondary tank is full (or holds the target quantity), then the algorithm proceeds from block 514 to block 518.

At block 516, the primary fill valve is closed. At block 518, the secondary fill valve is closed. After the primary fill valve and the secondary fill valve are closed, the algorithm proceeds to block 520, and the fill process begun at block 502 is ended. Once the fill process is ended at block 520, the algorithm proceeds to block 522, where food processing operations are allowed to begin.

From block 522, the algorithm proceeds to block 532, where a monitor and make-up water process is begun. From block 532, the algorithm proceeds to block 534, where the control system is set to automatic (AUTO) mode, which enables the control system to automatically control the wash water pumps and valves (e.g., solenoid valves) in the food processing system. From block 534, the algorithm proceeds to decision block 536, where the control system determines whether the feed belt (e.g., feed belt 120 in FIG. 4) is running. If the feed belt is not running, then the algorithm returns to decision block 536 (in some cases with a delay). That is, the algorithm may not proceed past decision block 536 until the feed belt is running. If the feed belt is running, then the algorithm proceeds to block 538.

At block 538, water curtains (e.g., the first, second, and third water sprayers 150, 160, and 260 in FIG. 4) of the food processing system are started. Starting the water curtains may entail starting pumps (e.g., pumps 362 and 462 in FIG. 4) and/or opening valves (e.g., valve 352 in FIG. 4, which may be a solenoid valve). From block 538, the algorithm then proceeds to point 530, which is also shown in FIG. 5B.

FIG. 5B shows the second sub-chart 500B. The portion of the algorithm shown in sub-chart 500B is a first part of a set of operations for managing wash water in the food processing system, according to aspects of the present disclosure. A second part of the set of operations for managing wash water in the food processing system is shown in the third sub-chart 500C, shown in FIG. 5C.

From point 530, the algorithm proceeds to three sub-processes. The first sub-process begins at block 540, the second sub-process begins at block 550, and the third sub-process begins at block 560.

The first sub-process begins at block 540 with the control system monitoring a water flow rate through a pre-rinse water curtain (e.g., second water sprayer 160 in FIG. 4). From block 540, the algorithm proceeds to decision block 542, where it is determined whether the pre-rinse water curtain water flow rate matches a flow set point for the pre-rinse water curtain. If the pre-rinse water curtain water flow rate does not match the flow set point for the pre-rinse water curtain, then the algorithm proceeds to block 544, where a control signal (e.g., a signal from the controller 470 to the pump 362 in FIG. 4) is adjusted to cause either an increase or a decrease in the pre-rinse water curtain water flow rate, depending on how the pre-rinse water curtain water flow rate compares to the flow set point for the pre-rinse water curtain. The flow set point for the pre-rinse water curtain may be a default value, if food processing has just begun, and may be adjusted at other blocks of the algorithm. From block 544, the algorithm returns to block 540. If, at decision block 542, the pre-rinse water curtain water flow rate matches the flow set point for the pre-rinse water curtain, then the algorithm proceeds to point 546, which is also in FIG. 5C.

The second sub-process begins at block 550 with the control system monitoring a water flow rate through a separation zone water curtain (e.g., first water sprayer 150 in FIG. 4). From block 550, the algorithm proceeds to decision block 552, where it is determined whether the separation zone water curtain water flow rate matches a flow set point for the separation zone water curtain. If the separation zone water curtain water flow rate does not match the flow set point for the separation zone water curtain, then the algorithm proceeds to block 554, where a control signal (e.g., a signal from the controller 470 to the pump 462 in FIG. 4) is adjusted to cause either an increase or a decrease in the separation zone water curtain water flow rate, depending on how the separation zone water curtain water flow rate compares to the flow set point for the separation zone water curtain. The flow set point for the separation zone water curtain may be a default value, if food processing has just begun, and may be adjusted at other blocks of the algorithm. From block 554, the algorithm returns to block 550. If, at decision block 552, the separation zone water curtain water flow rate matches the flow set point for the separation zone water curtain, then the algorithm proceeds to point 556, which is also in FIG. 5C.

The third sub-process begins at block 560 with the control system monitoring a water flow rate through a final rinse water curtain (e.g., third water sprayer 260 in FIG. 4). From block 560, the algorithm proceeds to decision block 562, where it is determined whether the final rinse water curtain water flow rate matches a flow set point for the final rinse water curtain. If the final rinse water curtain water flow rate does not match the flow set point for the final rinse water curtain, then the algorithm proceeds to block 564, where a control signal (e.g., a signal from the controller 470 to the valve 352 in FIG. 4) is adjusted to cause either an increase or a decrease in the final rinse water curtain water flow rate, depending on how the final rinse water curtain water flow rate compares to the flow set point for the final rinse water curtain. The flow set point for the final rinse water curtain may be a default value, if food processing has just begun, and may be adjusted at other blocks of the algorithm. From block 564, the algorithm returns to block 560. If, at decision block 562, the final rinse water curtain water flow rate matches the flow set point for the final rinse water curtain, then the algorithm proceeds to point 566, which is also in FIG. 5C.

Referring now to the third sub-chart 500C in FIG. 5C, from point 546, the algorithm proceeds to block 570, where the primary tank water level (e.g., the water level in wash tank 110 in FIG. 4) is monitored. The algorithm proceeds to decision block 571, where it is determined whether the primary tank is "full" (i.e., has at least a target quantity of usable wash water). Determining if the primary tank is full may include obtaining a signal from a water level sensor (e.g., water level sensor 372 in FIG. 4). If the primary tank is not full, then the algorithm proceeds to block 572, where water curtain flow rates are adjusted to increase a rate that water is added to the primary tank. Adjusting the water curtain flow rates in block 572 may include changing set points for the water curtain flow rates, increasing a flow rate through a zone separation water curtain (e.g., first water sprayer 150 in FIG. 4), and/or decreasing a flow rate through a pre-rinse water curtain (e.g., second water sprayer 160 in FIG. 4). If the water level in the primary tank is low enough (e.g., less than the second threshold amount), then a valve (e.g., valve 342 in FIG. 4) may be opened to surge water from a water source (e.g., water source 140 in FIG. 4) into the primary tank. If, at decision block 571, the primary tank is full, then the algorithm proceeds to block 573.

From point 556, the algorithm may proceed to both block 570 (described above) and block 580. From point 566, the algorithm may proceed to block 580.

At block 580, the secondary tank water level (e.g., the water level in wash tank 210 in FIG. 4) is monitored. The algorithm proceeds to decision block 581, where it is determined whether the secondary tank is "full" (i.e., has at least a target quantity of usable wash water). Determining if the secondary tank is full may include obtaining a signal from a water level sensor (e.g., water level sensor 472 in FIG. 4). If the secondary tank is not full, then the algorithm proceeds to block 582, where water curtain flow rates are adjusted to increase a rate that water is added to the secondary tank. Adjusting the water curtain flow rates in block 582 may include changing set points for the water curtain flow rates, decreasing a flow rate through a zone separation water curtain (e.g., first water sprayer 150 in FIG. 4), and/or increasing a flow rate through a final rinse water curtain (e.g., third water sprayer 260 in FIG. 4). If the water level in the secondary tank is low enough (e.g., less than the seventh threshold amount), then a valve (e.g., valve 442 in FIG. 4) may be opened to surge water from a water source (e.g., water source 140 in FIG. 4) into the secondary tank. If, at decision block 581, the secondary tank is full, then the algorithm proceeds to block 590.

At block 573, the water quality of the wash water in the primary tank (e.g., wash tank 110 in FIG. 4) is monitored. The algorithm proceeds to decision block 574, where it is determined whether the water quality of the wash water in the primary tank is acceptable (i.e., at a quality at or above a target quality). This may entail obtaining a signal regarding the quality of the wash water from a quality sensor (e.g., water quality sensor 374 in FIG. 4). If the water quality of the wash water in the primary tank is not acceptable (i.e., below the target quality), then the algorithm proceeds to block 575, where water flow through the food processing system is increased. Increasing water flow through the food processing system may include increasing the flow rates and set points for the water curtains (e.g., first water sprayer 150, second water sprayer 160, and third water sprayer 260 in FIG. 4) of the food processing system. Increasing the flow rate of the pre-rinse water curtain (e.g., second water sprayer 160 in FIG. 4) increases the rate that lower-quality water is removed from the primary tank. Increasing the flow rate of the separation zone water curtain (e.g., first water sprayer 150 in FIG. 4) increases the rate that higher-quality water from the secondary tank (e.g., wash tank 210 in FIG. 4) is added to the primary tank, which tends to raise the average quality of the wash water in the primary tank. Increasing the flow rate of the final rinse water curtain (e.g., third water sprayer 260 in FIG. 4) increases the rate that higher-quality rinse water is added to the secondary tank (e.g., wash tank 210 in FIG. 4) in order to make up for the higher rate that wash water is being removed from the secondary tank. From block 575, the algorithm proceeds to blocks 572 and 582. If, at decision block 574, the water quality of the wash water in the primary tank is determined to be acceptable, then the algorithm proceeds to block 590.

At block 590, a process to check whether the control system is in automatic or manual mode is started. From block 590, the algorithm proceeds to decision block 592, where it is determined whether the control system is in automatic mode or manual mode. If the control system is in automatic mode, then the algorithm proceeds to point 568, which is also in FIG. 5B. From point 568, the algorithm restarts the three sub-processes at 540, 550, and 560. If the control system is in manual mode at decision block 592, then the algorithm proceeds to block 594, where the control system stops monitoring and controlling operations.

Example Methods for Managing Wash Water

Figure 6:
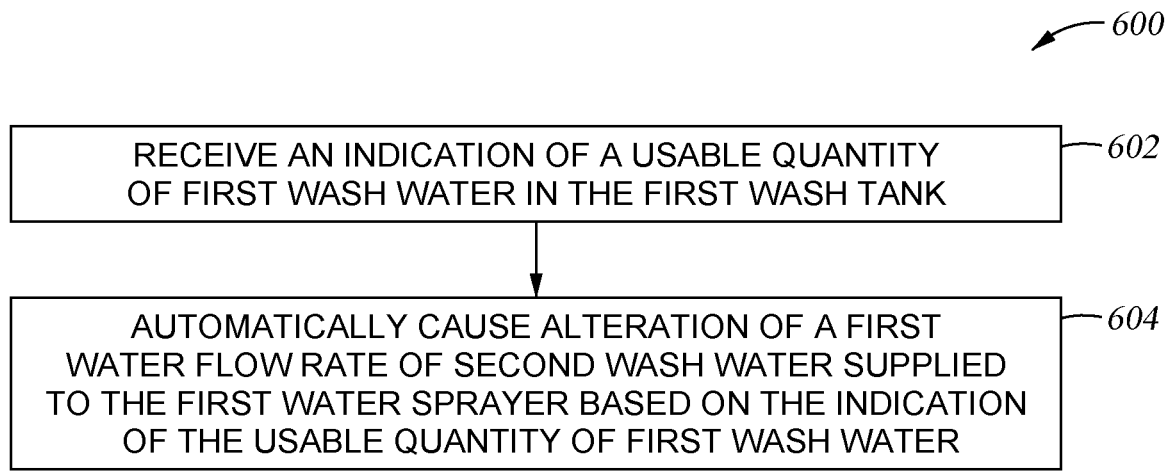
FIG. 6 is a flow diagram of example operations for managing wash water in a food processing system based on wash water quantity, in accordance with certain aspects of the present disclosure.

FIG. 6 is a flow diagram of example operations 600 for managing wash water in a food processing system, in accordance with aspects of the present disclosure. The food processing system may include a first wash tank (e.g., wash tank 110) for containing at least a portion of first wash water and a first water sprayer (e.g., water sprayer 150) configured to spray a quantity of second wash water on a food product being removed from the first wash tank. At least a portion of the quantity of the second wash water sprayed by the first water sprayer may enter the first wash tank and become the first wash water. The operations 600 may be performed by one or more controllers (e.g., controller 370 in FIG. 3 or controller 470 in FIG. 4) of a food processing system (e.g., the food processing system 300 in FIG. 3 or the food processing system 400 in FIG. 4).

The operations 600 may begin at block 602 by receiving an indication of a usable quantity of the first wash water in the first wash tank. For example, a controller (e.g., controller 370) may receive an indication (e.g., from water level sensor 372) of a usable quantity of first wash water in the first wash tank (e.g., wash tank 110).

At block 604, the operations 600 may continue by automatically causing alteration of a first flow rate of the second wash water supplied to the first water sprayer based on the indication of the usable quantity of the first wash water. Continuing the example from above, the controller may cause alteration (e.g., by sending a control signal to valve 352) of a first flow rate of the second wash water supplied to the first water sprayer (e.g., water sprayer 150) based on the detected usable quantity of the first wash water.

In aspects of the present disclosure, the indication indicates the usable quantity of the first wash water in block 602 is less than a first threshold. In this case, automatically causing alteration of the first flow rate in block 604 may involve causing an increase in the first flow rate.

In aspects of the present disclosure, the indication indicates the usable quantity of the first wash water in block 602 is less than a second threshold, where the second threshold is less than the first threshold. In this case, the operations 600 may further include automatically causing addition of water from a water source (e.g., the water source 140) to the first wash tank in response to the indication indicating the usable quantity is less than the second threshold.

In aspects of the present disclosure, the indication indicates the usable quantity of the first wash water in block 602 is greater than a threshold. In this case, automatically causing alteration of the first flow rate in block 604 may include causing a decrease in the first flow rate.

In aspects of the present disclosure, the indication of usable first wash water in block 602 is received from a water level sensor (e.g., water level sensor 372) positioned in the first wash tank above an inner bottom surface of the first wash tank. For certain aspects, the water level sensor may be disposed adjacent a lateral surface of the first wash tank.

In aspects of the present disclosure, the food processing system further comprises a first pump (e.g., pump 362) configured to pump a quantity of the first wash water to a second water sprayer (e.g., second water sprayer 160). The second water sprayer may be configured to spray the quantity of the first wash water on the food product prior to the food product being added to the first wash tank. In this case, the water level sensor may be positioned in the first wash tank at or above a level of an outlet (e.g., outlet 161) of the first wash tank. This outlet may be coupled to an inlet of the first pump.

In aspects of the present disclosure, the operations 600 further include automatically causing alteration of a second flow rate of the first wash water supplied to the second water sprayer based on the indication of the usable quantity of the first wash water. In certain aspects, the indication indicates the usable quantity of the first wash water is less than a threshold. In this case, automatically causing alteration of the second flow rate may involve causing a decrease in the second flow rate. In certain aspects, the indication indicates the usable quantity of the first wash water is greater than a threshold. In this case, automatically causing alteration of the second flow rate may involve causing an increase in the second flow rate. In certain aspects, automatically causing alteration of the second flow rate may include controlling the first pump to change an output flow rate of the first pump.

In aspects of the present disclosure, the food processing system further includes a second wash tank (e.g., wash tank 210) for containing at least a portion of the second wash water. In this case, the quantity of the second wash water sprayed by the first water sprayer may be taken from the second wash tank, and the food product removed from the first wash tank may be added to the second wash tank after being sprayed with the quantity of the second wash water by the first water sprayer. For certain aspects, the food processing system further includes a third water sprayer (e.g., water sprayer 260). In this case, the third water sprayer may be configured to spray a quantity of rinse water on the food product after the food product is removed from the second wash tank, where at least a portion of the quantity of the rinse water sprayed by the third water sprayer may enter the second wash tank and become the second wash water. For certain aspects, the operations 600 further include receiving an indication of a usable quantity of the second wash water in the second wash tank and automatically causing alteration of a third flow rate of the rinse water supplied to the third water sprayer based on the detected usable quantity of the second wash water. In certain aspects, automatically causing alteration of the third flow rate involves causing an adjustment of a valve (e.g., valve 352) controlling the third flow rate of the rinse water to the third water sprayer.

Figure 7:
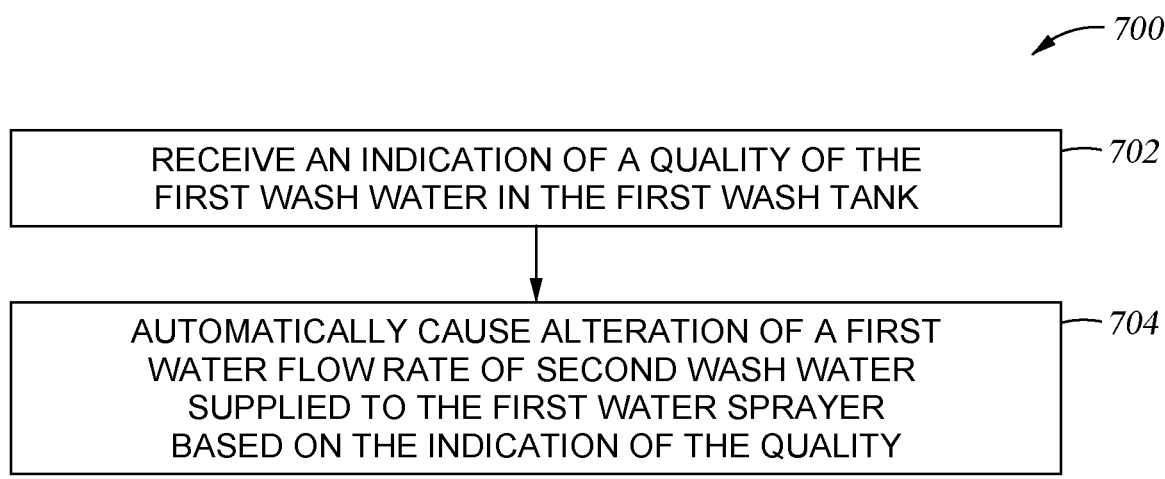
FIG. 7 is a flow diagram of example operations for managing wash water in a food processing system based on wash water quality, in accordance with certain aspects of the present disclosure.

FIG. 7 is a flow diagram of example operations 700 for managing wash water in a food processing system, in accordance with aspects of the present disclosure. The food processing system may include a first wash tank (e.g., wash tank 110) for containing at least a portion of first wash water and a first water sprayer (e.g., water sprayer 150) configured to spray a quantity of second wash water on a food product being removed from the first wash tank. At least a portion of the quantity of the second wash water sprayed by the first water sprayer may enter the first wash tank and become the first wash water. The operations 700 may be performed by one or more controllers (e.g., controller 370 in FIG. 3 or controller 470 in FIG. 4) of a food processing system (e.g., the food processing system 300 in FIG. 3 or the food processing system 400 in FIG. 4).

The operations 700 may begin at block 702 with the controller receiving an indication of a quality of the first wash water in the first wash tank. For example, the controller (e.g., controller 370) may receive an indication of a quality (e.g., a pH) of the first wash water in the first wash tank (e.g., wash tank 110).

At block 704, the operations 700 may continue by automatically causing alteration of a first flow rate of the second wash water supplied to the first water sprayer based on the detected quality. Continuing the example from above, the controller automatically causes alteration (e.g., by sending a control signal to valve 352) of a first flow rate of the second wash water supplied to the first water sprayer (e.g., water sprayer 150).

In aspects of the present disclosure, the indication indicates the quality of the first wash water at block 702 is less than a first threshold. In this case, automatically causing alteration of the first flow rate at block 704 may involve causing an increase in the first flow rate.

In aspects of the present disclosure, the indication indicates the quality of the first wash water at block 702 is less than a second threshold, where the second threshold is less than the first threshold. In this case, the operations 700 may further include automatically causing adding of water from a water source (e.g., water source 140) to the first wash tank in response to the indication indicating the quality is less than the second threshold.

In aspects of the present disclosure, the indication indicates the quality of the first wash water at block 702 is greater than a threshold. In this case, automatically causing alteration of the first flow rate at block 704 may involve causing a decrease in the first flow rate.

In aspects of the present disclosure, the indication of the quality of the first wash water at block 702 is received from a water quality sensor (e.g., water quality sensor 374). For example, the water quality sensor may be an optical sensor, such as an ultraviolet (UV) sensor, a visible light sensor, or an infrared (IR) sensor.

In aspects of the present disclosure, the food processing system further includes a first pump (e.g., pump 362) configured to pump a quantity of the first wash water to a second water sprayer (e.g., water sprayer 160). In this case, the second water sprayer may be configured to spray the quantity of the first wash water on the food product prior to the food product being added to the first wash tank. For certain aspects, the optical sensor is positioned in a pipe (e.g., pipe 166) connecting the first pump with the second water sprayer.

In aspects of the present disclosure, the operations 700 further include automatically causing alteration of a second flow rate of the first wash water supplied to the second water sprayer based on the indication of the quality. In some cases, the indicated quality of the first wash water is less than a threshold. In such cases, automatically causing alteration of the second flow rate may involve causing an increase in the second flow rate. In other cases, the indicated quality of the first wash water is greater than a threshold, and automatically causing alteration of the second flow rate may involve causing a decrease in the second flow rate.

In aspects of the present disclosure, the food processing system further includes a second wash tank (e.g., wash tank 210) for containing at least a portion of the second wash water. In this case, the quantity of the second wash water sprayed by the first water sprayer may be taken from the second wash tank, and the food product removed from the first wash tank may be added to the second wash tank after being sprayed with the second wash water by the first water sprayer. For certain aspects, the food processing system also includes a third water sprayer (e.g., water sprayer 260). The third water sprayer may be configured to spray a quantity of rinse water on the food product after the food product is removed from the second wash tank, and at least a portion of the quantity of the rinse water sprayed by the third water sprayer may enter the second wash tank and become the second wash water. In this case, the operations 700 may further include: receiving an indication of a quality of the second wash water in the second wash tank and automatically causing alteration of a third flow rate of the rinse water supplied to the third water sprayer based on the indication of the quality of the second wash water. In certain aspects, automatically causing alteration of the third flow rate involves causing an adjustment of a valve (e.g., valve 352) controlling the third flow rate of the rinse water to the third water sprayer.

Figure 8:
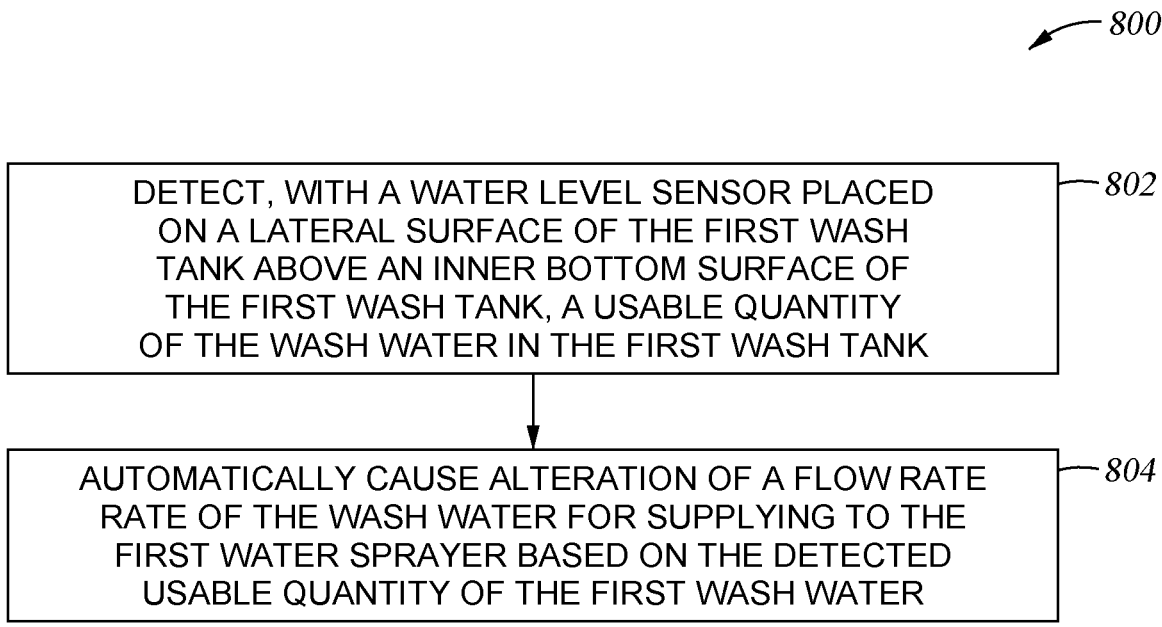
FIG. 8 is a flow diagram of example operations for managing wash water in a food processing system based on a detected usable quantity of wash water, in accordance with certain aspects of the present disclosure.

FIG. 8 is a flow diagram of example operations 800 for managing wash water in a food processing system, in accordance with aspects of the present disclosure. The food processing system may include a wash tank (e.g., wash tank 110) for containing at least a portion of the wash water and a water sprayer (e.g., water sprayer 150) configured to spray a quantity of the wash water on a food product. The operations 800 may be performed by one or more water level sensors (e.g., water level sensor 372) and one or more controllers (e.g., controller 370 in FIG. 3 or controller 470 in FIG. 4) of a food processing system (e.g., the food processing system 300 in FIG. 3 or the food processing system 400 in FIG. 4).

The operations 800 may begin at block 802 by detecting, with a water level sensor disposed adjacent to a lateral surface of the wash tank and above an inner bottom surface of the wash tank, a usable quantity of the wash water in the wash tank. For example, a water level sensor (e.g., water level sensor 372)—disposed adjacent to a lateral surface of the wash tank (e.g., wash tank 110) and above an inner bottom surface of the wash tank—detects a usable quantity of the wash water in the wash tank.

At block 804, the operations 800 may continue by automatically causing alteration of a flow rate of the wash water for supplying to the water sprayer based on the detected usable quantity of the wash water. Continuing the example from above, the controller (e.g., controller 370) automatically causes alteration (e.g., by sending a control signal) of a flow rate of the wash water for supplying to the water sprayer (e.g., water sprayer 150) based on the detected usable quantity of the wash water.

In aspects of the present disclosure, the operations 800 further include spraying the quantity of the wash water on the food product prior to the food product being added to the wash tank, and pumping the quantity of the wash water for supplying to the water sprayer with a pump (e.g., pump 362). In this case, the water level sensor may be positioned in the wash tank at or above a level of an outlet (e.g., outlet 161) of the wash tank, where the outlet is coupled to an inlet of the pump (e.g., fluidly coupled by a pipe or other tubing).

Example Method for Modifying a Food Processing System to Manage Wash Water

Figure 9:
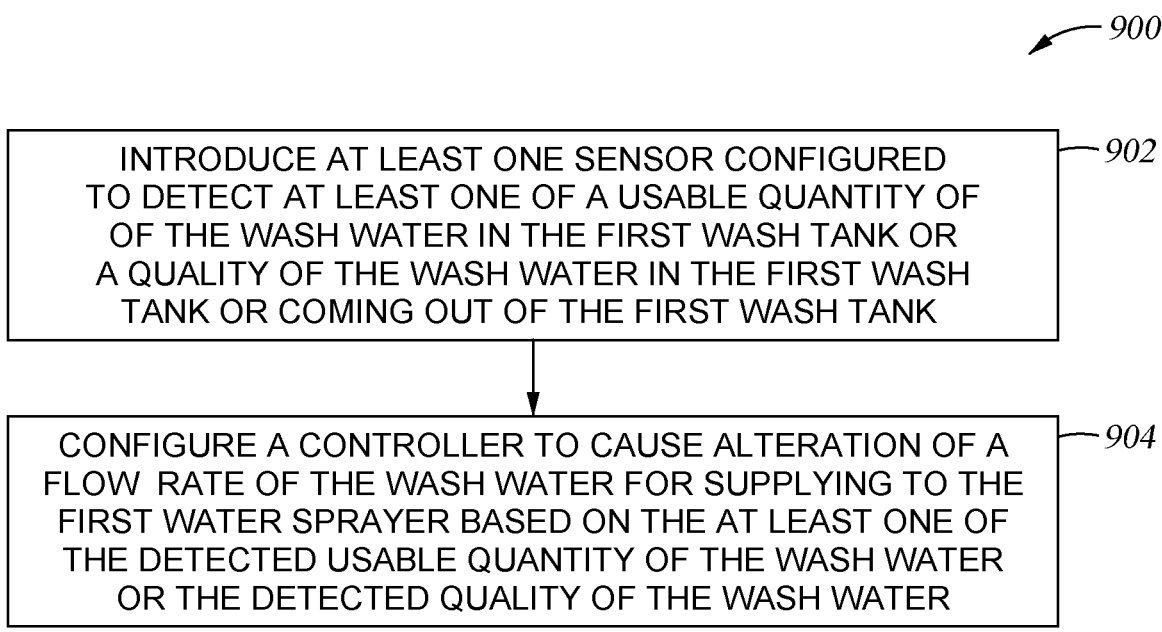
FIG. 9 is a flow diagram of example operations for modifying a processing system to manage wash water, in accordance with certain aspects of the present disclosure.

FIG. 9 is a flow diagram of example operations 900 for modifying a food processing system to manage wash water, in accordance with aspects of the present disclosure. The food processing system may include a first wash tank (e.g., wash tank 110) for containing at least a portion of the wash water and a water sprayer (e.g., water sprayer 150) configured to spray a quantity of the wash water on a food product. The operations 900 may be performed by one or more operators of a food processing system (e.g., the food processing system 100 shown in FIG. 1 or the food processing system 200 shown in FIG. 2).

The operations 900 may begin at block 902 by introducing at least one sensor configured to detect at least one of a usable quantity of the wash water in the first wash tank or a quality of the wash water in the first wash tank or coming out of the first wash tank. For example, an operator may introduce at least one sensor (e.g., water level sensor 372 and/or water quality sensor 374) configured to detect at least one of a usable quantity of the wash water in the first wash tank (e.g., wash tank 110) or a quality of the wash water in the first wash tank or coming out of the first wash tank (e.g., in pipe 166).

At block 904, the operations 900 may continue by configuring a controller to cause alteration of a flow rate of the wash water for supplying to the water sprayer based on the at least one of the detected usable quantity of the wash water or the detected quality of the wash water. Continuing the example from above, the operator may configure a controller (e.g., controller 370 shown in FIG. 3 or controller 470 shown in FIG. 4) to cause alteration (e.g., by sending a control signal) of a flow rate of the wash water for supplying to the water sprayer (e.g., water sprayer 150) based on the detected usable quantity of the wash water and/or the detected quality of the wash water.

Example Aspects

In addition to the various aspects described above, specific combinations of aspects are within the scope of the present disclosure, some of which are detailed below.

Aspect 1: A method for managing wash water in a food processing system comprising a first wash tank for containing at least a portion of first wash water and a first water sprayer configured to spray a quantity of second wash water on a food product being removed from the first wash tank, wherein at least a portion of the quantity of the second wash water sprayed by the first water sprayer enters the first wash tank and becomes the first wash water, the method comprising: receiving an indication of a usable quantity of the first wash water in the first wash tank; and automatically causing alteration of a first flow rate of the second wash water for supplying to the first water sprayer based on the indication of the usable quantity of the first wash water.

Aspect 2: The method of Aspect 1, wherein: the indication indicates the usable quantity of the first wash water is less than a first threshold; and automatically causing alteration of the first flow rate comprises causing an increase in the first flow rate.

Aspect 3: The method of Aspect 2, wherein: the indication indicates the usable quantity of the first wash water is less than a second threshold, which is less than the first threshold; and the method further comprises automatically causing addition of water from a water source to the first wash tank in response to the indication indicating the usable quantity is less than the second threshold.

Aspect 4: The method of Aspect 1, wherein: the indication indicates the usable quantity of the first wash water is greater than a threshold; and automatically causing alteration of the first flow rate comprises causing a decrease in the first flow rate.

Aspect 5: The method of any of Aspects 1-4, wherein the indication of usable first wash water is received from a water level sensor positioned in the first wash tank above an inner bottom surface of the first wash tank.

Aspect 6: The method of Aspect 5, wherein: the food processing system further comprises a first pump configured to pump a quantity of the first wash water to a second water sprayer; the second water sprayer is configured to spray the quantity of the first wash water on the food product prior to the food product being added to the first wash tank; and the water level sensor is positioned in the first wash tank at or above a level of an outlet of the first wash tank that is coupled to an inlet of the first pump.

Aspect 7: The method of Aspect 6, further comprising automatically causing alteration of a second flow rate of the first wash water for supplying to the second water sprayer based on the indication of the usable quantity of the first wash water.

Aspect 8: The method of Aspect 7, wherein: the indication indicates the usable quantity of the first wash water is less than a threshold; and automatically causing alteration of the second flow rate comprises causing a decrease in the second flow rate.

Aspect 9: The method of Aspect 7, wherein: the indication indicates the usable quantity of the first wash water is greater than a threshold; and automatically causing alteration of the second flow rate comprises causing an increase in the second flow rate.

Aspect 10: The method of Aspect 7, wherein automatically causing alteration of the second flow rate comprises controlling the first pump to change an output flow rate of the first pump.

Aspect 11: The method of any of Aspects 6-10, wherein: the food processing system further comprises: a second wash tank for containing at least a portion of the second wash water, wherein the quantity of the second wash water sprayed by the first water sprayer is taken from the second wash tank and wherein the food product removed from the first wash tank is added to the second wash tank after being sprayed with the quantity of the second wash water by the first water sprayer, and a third water sprayer, wherein the third water sprayer is configured to spray a quantity of rinse water on the food product after the food product is removed from the second wash tank; at least a portion of the quantity of the rinse water sprayed by the third water sprayer enters the second wash tank and becomes the second wash water; and the method further comprises: receiving an indication of a usable quantity of the second wash water in the second wash tank; and automatically causing alteration of a third flow rate of the rinse water for supplying to the third water sprayer based on the detected usable quantity of the second wash water.

Aspect 12: The method of Aspect 11, wherein automatically causing alteration of the third flow rate comprises causing an adjustment of a valve controlling the third flow rate of the rinse water to the third water sprayer.

Aspect 13: A food processing system comprising: a first wash tank for containing at least a portion of first wash water; a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; and a controller configured to: obtain an indication of a usable quantity of the first wash water in the first wash tank; and control a first flow rate of the second wash water supplied to the first water sprayer, based on the indication.

Aspect 14: The food processing system of Aspect 13, wherein to control the first flow rate, the controller is configured to cause an increase in the first flow rate when the indication indicates the usable quantity of the first wash water is less than a first threshold.

Aspect 15: The food processing system of Aspect 14, further comprising a valve operable to adjust a flow of water from a water source to the first wash tank, wherein the controller is further configured to open the valve or to increase an opening of the valve when the indication indicates the usable quantity of the first wash water is less than a second threshold, which is less than the first threshold.

Aspect 16: The food processing system of any of Aspects 13-15, wherein to control the first flow rate, the controller is configured to cause a decrease in the first flow rate when the indication indicates the usable quantity of the first wash water is greater than a threshold.

Aspect 17: The food processing system of any of Aspects 13-16, further comprising a water level sensor positioned in the first wash tank above an inner bottom surface of the first wash tank, wherein the water level sensor is configured to detect the usable quantity of the first wash water in the first wash tank and wherein the controller is configured to obtain the indication of the usable quantity of the first wash water from the water level sensor.

Aspect 18: The food processing system of Aspect 17, further comprising: a second water sprayer configured to spray a quantity of the first wash water on the food product prior to the food product being added to the first wash tank; and a first pump configured to pump the quantity of the first wash water to the second water sprayer, wherein the water level sensor is positioned in the first wash tank at or above a level of an outlet of the first wash tank coupled to an inlet of the first pump.

Aspect 19: The food processing system of Aspect 18, wherein the controller is further configured to control a second flow rate of the first wash water supplied to the second water sprayer based on the indication of the usable quantity of the first wash water.

Aspect 20: The food processing system of Aspect 19, wherein to control the second flow rate, the controller is configured to cause a decrease in the second flow rate when the indication of the usable quantity of the first wash water indicates the usable quantity is less than a threshold.

Aspect 21: The food processing system of any of Aspects 19-20, wherein to control the second flow rate, the controller is configured to cause an increase in the second flow rate when the indication of the usable quantity of the first wash water indicates the usable quantity is greater than a threshold.

Aspect 22: The food processing system of any of Aspects 19-21, wherein to control the second flow rate, the controller is configured to control the first pump to change an output flow rate of the first pump.

Aspect 23: The food processing system of any of Aspects 18-22, further comprising: a second wash tank for containing at least a portion of the second wash water, wherein the quantity of the second wash water sprayed by the first water sprayer is taken from the second wash tank and wherein the second wash tank is configured to receive the food product removed from the first wash tank after the food product is sprayed with the quantity of the second wash water by the first water sprayer; and a third water sprayer, wherein the third water sprayer is configured to spray a quantity of rinse water on the food product after the food product is removed from the second wash tank, wherein the third water sprayer is configured such that at least a portion of the quantity of the rinse water sprayed by the third water sprayer is configured to enter the second wash tank and become the second wash water, and wherein the controller is further configured to: obtain an indication of a usable quantity of the second wash water in the second wash tank; and control a third flow rate of the rinse water supplied to the third water sprayer based on the indication of the usable quantity of the second wash water.

Aspect 24: The food processing system of Aspect 23, further comprising a valve configured to adjust the third flow rate of the rinse water to the third water sprayer, wherein to control the third flow rate, the controller is configured to control the valve.

Aspect 25: A method for managing wash water in a food processing system comprising a first wash tank for containing at least a portion of first wash water and a first water sprayer configured to spray a quantity of second wash water on a food product being removed from the first wash tank, wherein at least a portion of the quantity of the second wash water sprayed by the first water sprayer enters the first wash tank and becomes the first wash water, the method comprising: receiving an indication of a quality of the first wash water in the first wash tank; and automatically causing alteration of a first flow rate of the second wash water for supplying to the first water sprayer based on the indication of the quality.

Aspect 26: The method of Aspect 25, wherein: the indication indicates the quality of the first wash water is less than a first threshold; and automatically causing alteration of the first flow rate comprises causing an increase in the first flow rate.

Aspect 27: The method of Aspect 26, wherein: the indication indicates the quality of the first wash water is less than a second threshold, which is less than the first threshold; and the method further comprises automatically causing addition of water from a water source to the first wash tank in response to the indication indicating the quality is less than the second threshold.

Aspect 28: The method of Aspect 25, wherein: the indication indicates the quality of the first wash water is greater than a threshold; and automatically causing alteration of the first flow rate comprises causing a decrease in the first flow rate.

Aspect 29: The method of any of Aspects 25-28, wherein the indication of the quality of the first wash water is received from an optical sensor.

Aspect 30: The method of Aspect 29, wherein the optical sensor comprises an ultraviolet (UV) sensor.

Aspect 31: The method of any of Aspects 29-30, wherein: the food processing system further comprises a first pump configured to pump a quantity of the first wash water to a second water sprayer, wherein the second water sprayer is configured to spray the quantity of the first wash water on the food product prior to the food product being added to the first wash tank; and the optical sensor is positioned in a pipe connecting the first pump with the second water sprayer.

Aspect 32: The method of Aspect 31, further comprising automatically causing alteration of a second flow rate of the first wash water for supplying to the second water sprayer based on the indication of the quality.

Aspect 33: The method of Aspect 32, wherein: the indicated quality of the first wash water is less than a threshold; and automatically causing alteration of the second flow rate comprises causing an increase in the second flow rate.

Aspect 34: The method of Aspect 33, wherein: the indicated quality of the first wash water is greater than a threshold; and automatically causing alteration of the second flow rate comprises causing a decrease in the second flow rate.

Aspect 35: The method of any of Aspects 32-34, wherein automatically causing alteration of the second flow rate comprises controlling the first pump to change an output flow rate of the first pump.

Aspect 36: The method of any of Aspects 25-35, wherein: the food processing system further comprises: a second wash tank for containing at least a portion of the second wash water, wherein the quantity of the second wash water sprayed by the first water sprayer is taken from the second wash tank and wherein the food product removed from the first wash tank is added to the second wash tank after being sprayed with the second wash water by the first water sprayer, and a third water sprayer, wherein the third water sprayer is configured to spray a quantity of rinse water on the food product after the food product is removed from the second wash tank; at least a portion of the quantity of the rinse water sprayed by the third water sprayer enters the second wash tank and becomes the second wash water; and the method further comprises: receiving an indication of a quality of the second wash water in the second wash tank; and automatically causing alteration of a third flow rate of the rinse water for supplying to the third water sprayer based on the indication of the quality of the second wash water.

Aspect 37: The method of Aspect 36, wherein automatically causing alteration of the third flow rate comprises causing an adjustment of a valve controlling the third flow rate of the rinse water to the third water sprayer.

Aspect 38: A food processing system comprising: a first wash tank for containing at least a portion of first wash water; a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; a controller configured to: obtain an indication of a quality of the first wash water in the first wash tank; and control a first flow rate of the second wash water supplied to the first water sprayer, based on the indication.

Aspect 39: The food processing system of Aspect 38, wherein to control the first flow rate, the controller is configured to cause an increase in the first flow rate when the indication indicates the quality of the first wash water is less than a first threshold.

Aspect 40: The food processing system of Aspect 39, further comprising a valve operable to adjust a flow of water from a water source to the first wash tank, wherein the controller is further configured to open the valve or to increase an opening of the valve when the indication indicates the quality of the first wash water is less than a second threshold, which is less than the first threshold.

Aspect 41: The food processing system of any of Aspects 38-40, wherein to control the first flow rate, the controller is configured to cause a decrease in the first flow rate when the indication of the quality of the first wash water indicates the quality of the first wash water is greater than a threshold.

Aspect 42: The food processing system of any of Aspects 38-41, further comprising an optical sensor configured to detect the quality of the first wash water in the first wash tank or coming out of the first wash tank, wherein the controller is configured to obtain the indication of the quality of the first wash water from the optical sensor.

Aspect 43: The food processing system of Aspect 42, wherein the optical sensor comprises an ultraviolet (UV) sensor.

Aspect 44: The food processing system of any of Aspects 42-43, further comprising: a second water sprayer configured to spray a quantity of the first wash water on the food product prior to the food product being added to the first wash tank; and a first pump configured to pump the quantity of the first wash water to the second water sprayer, wherein the optical sensor is configured to introduce an optical signal into a pipe coupled between the first pump and the second water sprayer.

Aspect 45: The food processing system of Aspect 44, wherein the controller is further configured to control a second flow rate of the first wash water supplied to the second water sprayer based on the indication of the quality.

Aspect 46: The food processing system of Aspect 45, wherein to control the second flow rate, the controller is configured to cause an increase in the second flow rate when the indication of the quality of the first wash water indicates the quality is less than a threshold.

Aspect 47: The food processing system of any of Aspects 45-46, wherein to control the second flow rate, the controller is configured to cause a decrease in the second flow rate when the quality of the first wash water is greater than a threshold.

Aspect 48: The food processing system of any of Aspects 45-47, wherein to control the second flow rate, the controller is configured to control the first pump to change an output flow rate of the first pump.

Aspect 49: The food processing system of any of Aspects 38-48, further comprising: a second wash tank for containing at least a portion of the second wash water, wherein the quantity of the second wash water sprayed by the first water sprayer is configured to be taken from the second wash tank and wherein the second wash tank is configured to receive the food product removed from the first wash tank after the food product is sprayed with the quantity of the second wash water by the first water sprayer; and a third water sprayer, wherein the third water sprayer is configured to spray a quantity of rinse water on the food product after the food product is removed from the second wash tank, wherein the third water sprayer is configured such that at least a portion of the quantity of the rinse water sprayed by the third water sprayer is configured to enter the second wash tank and become the second wash water, and wherein the controller is further configured to: obtain an indication of a quality of the second wash water in the second wash tank; and control a third flow rate of the rinse water supplied to the third water sprayer, based on the indication of the quality of the second wash water.

Aspect 50: The food processing system of Aspect 49, further comprising a valve configured to adjust the third flow rate of the rinse water to the third water sprayer, wherein to control the third flow rate, the controller is configured to control the valve.

Aspect 51: A method for managing wash water in a food processing system comprising a wash tank for containing at least a portion of the wash water and a water sprayer configured to spray a quantity of the wash water on a food product, the method comprising: detecting, with a water level sensor disposed adjacent to a lateral surface of the wash tank and above an inner bottom surface of the wash tank, a usable quantity of the wash water in the wash tank; and automatically causing alteration of a flow rate of the wash water for supplying to the water sprayer based on the detected usable quantity of the wash water.

Aspect 52: The method of Aspect 51, further comprising: spraying the quantity of the wash water on the food product prior to the food product being added to the wash tank; and pumping the quantity of the wash water for supplying to the water sprayer with a pump, wherein the water level sensor is positioned in the wash tank at or above a level of an outlet of the wash tank that is coupled to an inlet of the pump.

Aspect 53: A food processing system comprising: a wash tank for containing wash water; a water sprayer configured to spray a quantity of the wash water on a food product; a water level sensor disposed adjacent to a lateral surface of the wash tank and above an inner bottom surface of the wash tank, wherein the water level sensor is configured to detect a usable quantity of the wash water in the wash tank; and a controller coupled to the water level sensor and to the water sprayer and configured to: obtain an indication of the usable quantity of the wash water in the wash tank from the water level sensor; and control a flow rate of the wash water supplied to the water sprayer, based on the indication.

Aspect 54: The food processing system of Aspect 53, further comprising a pump configured to pump the quantity of the wash water to the water sprayer, wherein the water level sensor is positioned in the wash tank at or above a level of an outlet of the wash tank that is coupled to an inlet of the pump.

Aspect 55: A method for managing wash water in a food processing system comprising a first wash tank for containing at least a portion of first wash water and a first water sprayer configured to spray a quantity of second wash water on a food product being removed from the first wash tank, wherein at least a portion of the quantity of the second wash water sprayed by the first water sprayer enters the first wash tank and becomes the first wash water, the method comprising: obtaining an indication of a chlorine concentration of the first wash water in the first wash tank; and automatically causing alteration of a first flow rate of the second wash water for supplying to the first water sprayer based on the indication of the chlorine concentration.

Aspect 56: The method of Aspect 55, wherein: the indication indicates the chlorine concentration of the first wash water is less than a first threshold; and automatically causing alteration of the first flow rate comprises causing an increase in the first flow rate.

Aspect 57: The method of Aspect 56, wherein: the indication indicates the chlorine concentration of the first wash water is less than a second threshold, which is less than the first threshold; and the method further comprises automatically causing addition of water from a water source to the first wash tank in response to the indication indicates the chlorine concentration is less than the second threshold.

Aspect 58: The method of Aspect 55, wherein: the indication indicates the chlorine concentration of the first wash water is greater than a threshold; and automatically causing alteration of the first flow rate comprises causing a decrease in the first flow rate.

Aspect 59: The method of any of Aspects 55-58, wherein: the food processing system further comprises a first pump configured to pump a quantity of the first wash water to a second water sprayer, wherein the second water sprayer is configured to spray the quantity of the first wash water on the food product prior to the food product being added to the first wash tank; and the indication of the chlorine concentration is obtained from a sensor positioned in a pipe connecting the first pump with the second water sprayer.

Aspect 60: The method of Aspect 59, further comprising automatically causing alteration of a second flow rate of the first wash water for supplying to the second water sprayer based on the indication of the chlorine concentration.

Aspect 61: The method of Aspect 60, wherein: the indication indicates the chlorine concentration of the first wash water is less than a threshold; and automatically causing alteration of the second flow rate comprises causing an increase in the second flow rate.

Aspect 62: The method of Aspect 61, wherein: the indication indicates the chlorine concentration of the first wash water is greater than a threshold; and automatically causing alteration of the second flow rate comprises causing a decrease in the second flow rate.

Aspect 63: The method of any of Aspects 60-62, wherein automatically causing alteration of the second flow rate comprises controlling the first pump to change an output flow rate of the first pump.

Aspect 64: The method of any of Aspects 55-63, wherein: the food processing system further comprises: a second wash tank for containing at least a portion of the second wash water, wherein the quantity of the second wash water sprayed by the first water sprayer is taken from the second wash tank and wherein the food product removed from the first wash tank is added to the second wash tank after being sprayed with the second wash water by the first water sprayer, and a third water sprayer, wherein the third water sprayer is configured to spray a quantity of rinse water on the food product after the food product is removed from the second wash tank; at least a portion of the quantity of the rinse water sprayed by the third water sprayer enters the second wash tank and becomes the second wash water; and the method further comprises: obtaining an indication of a chlorine concentration of the second wash water in the second wash tank; and automatically causing alteration of a third flow rate of the rinse water for supplying to the third water sprayer based on the indication of the chlorine concentration of the second wash water.

Aspect 65: The method of Aspect 64, wherein automatically causing alteration of the third flow rate comprises causing adjustment of a valve controlling the third flow rate of the rinse water to the third water sprayer.

Aspect 66: A food processing system comprising: a first wash tank for containing at least a portion of first wash water; a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; a controller configured to: obtain an indication of a chlorine concentration of the first wash water in the first wash tank; and control a first flow rate of the second wash water supplied to the first water sprayer, based on the indication.

Aspect 67: The food processing system of Aspect 66, wherein to control the first flow rate, the controller is configured to cause an increase in the first flow rate when the indication indicates the chlorine concentration of the first wash water is less than a first threshold.

Aspect 68: The food processing system of Aspect 67, further comprising a valve operable to adjust a flow of water from a water source to the first wash tank, wherein the controller is further configured to open the valve or to increase an opening of the valve when the indication indicates the chlorine concentration of the first wash water is less than a second threshold, which is less than the first threshold.

Aspect 69: The food processing system of Aspect 66, wherein to control the first flow rate, the controller is configured to cause a decrease in the first flow rate when the indication of the chlorine concentration of the first wash water indicates the chlorine concentration of the first wash water is greater than a threshold.

Aspect 70: The food processing system of Aspect 69, further comprising: a second water sprayer configured to spray a quantity of the first wash water on the food product prior to the food product being added to the first wash tank; a first pump configured to pump the quantity of the first wash water to the second water sprayer; and a sensor on a pipe coupling the first pump to the second water sprayer, wherein the sensor is configured to detect the chlorine concentration of the first wash water and provide the indication to the controller.

Aspect 71: The food processing system of Aspect 70, wherein the controller is further configured to control a second flow rate of the first wash water supplied to the second water sprayer based on the indication of the chlorine concentration.

Aspect 72: The food processing system of Aspect 71, wherein to control the second flow rate, the controller is further configured to cause an increase in the second flow rate when the indication of the chlorine concentration of the first wash water indicates the chlorine concentration is less than a threshold.

Aspect 73: The food processing system of Aspect 71, wherein to control the second flow rate, the controller is further configured to cause a decrease in the second flow rate when the indication indicates the chlorine concentration of the first wash water is greater than a threshold.

Aspect 74: The food processing system of Aspect 71, wherein to control the second flow rate, the controller is configured to control the first pump to change an output flow rate of the first pump.

Aspect 75: The food processing system of Aspect 66, further comprising: a second wash tank for containing at least a portion of the second wash water, wherein the quantity of the second wash water sprayed by the first water sprayer is configured to be taken from the second wash tank and wherein the second wash tank is configured to receive the food product removed from the first wash tank after the food product is sprayed with the quantity of the second wash water by the first water sprayer; and a third water sprayer, wherein the third water sprayer is configured to spray a quantity of rinse water on the food product after the food product is removed from the second wash tank, wherein the third water sprayer is configured such that at least a portion of the quantity of the rinse water sprayed by the third water sprayer is configured to enter the second wash tank and become the second wash water, and wherein the controller is further configured to: obtain an indication of a chlorine concentration of the second wash water in the second wash tank; and control a third flow rate of the rinse water supplied to the third water sprayer, based on the indication of the chlorine concentration of the second wash water.

Aspect 76: The food processing system of Aspect 75, further comprising a valve configured to adjust the third flow rate of the rinse water to the third water sprayer, wherein to control the third flow rate, the controller is configured to control the valve.

Aspect 77: A method for modifying a food processing system to manage wash water, the food processing system comprising a first wash tank for containing at least a portion of the wash water and a water sprayer configured to spray a quantity of the wash water on a food product, the method comprising: introducing at least one sensor configured to detect at least one of a usable quantity of the wash water in the first wash tank or a quality of the wash water in the first wash tank or coming out of the first wash tank; and configuring a controller to cause alteration of a flow rate of the wash water for supplying to the water sprayer based on the at least one of the detected usable quantity of the wash water or the detected quality of the wash water.

While the present disclosure has included detail in connection with a limited number of aspects, it should be readily understood that the present disclosure is not limited to such described aspects. Rather, the present disclosure can be modified to incorporate any number of variations, alterations, substitutions, combinations, sub-combinations, or equivalent arrangements not heretofore described, but which are commensurate with the scope of the present disclosure. Additionally, while various aspects have been described, it is to be understood that certain aspects of the present disclosure may include only some of the described features.

The term "about" is intended to include the degree of error associated with measurement of the particular quantity based upon the equipment available at the time of filing the application. For example, "about" may include a range of ±8%, 5%, or 2% of a given value.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, "a processor," "at least one processor," or "one or more processors" generally refers to a single processor configured to perform one or multiple operations or multiple processors configured to collectively perform one or more operations. Furthermore, the terms "processor" and "controller" may be used interchangeably herein. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

While the present disclosure has been described with reference to various exemplary aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular aspects described herein, but that the present disclosure will include all aspects falling within the scope of the claims.

What is claimed is:

1. A food processing system comprising:
    a first wash tank for containing at least a portion of first wash water;
    a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water; and
    a controller configured to:
        obtain an indication of a usable quantity of the first wash water in the first wash tank; and
        control a first flow rate of the second wash water supplied to the first water sprayer, based on the indication.

2. The food processing system of claim 1, wherein to control the first flow rate, the controller is configured to cause an increase in the first flow rate when the indication indicates the usable quantity of the first wash water is less than a first threshold.

3. The food processing system of claim 2, further comprising a valve operable to adjust a flow of water from a water source to the first wash tank, wherein the controller is further configured to open the valve or to increase an opening of the valve when the indication indicates the usable quantity of the first wash water is less than a second threshold, which is less than the first threshold.

4. The food processing system of claim 1, wherein to control the first flow rate, the controller is configured to cause a decrease in the first flow rate when the indication indicates the usable quantity of the first wash water is greater than a threshold.

5. The food processing system of claim 1, further comprising a water level sensor positioned in the first wash tank above an inner bottom surface of the first wash tank, wherein the water level sensor is configured to detect the usable quantity of the first wash water in the first wash tank and wherein the controller is configured to obtain the indication of the usable quantity of the first wash water from the water level sensor.

6. The food processing system of claim 5, further comprising:
    a second water sprayer configured to spray a quantity of the first wash water on the food product prior to the food product being added to the first wash tank; and
    a first pump configured to pump the quantity of the first wash water to the second water sprayer, wherein the water level sensor is positioned in the first wash tank at or above a level of an outlet of the first wash tank coupled to an inlet of the first pump.

7. The food processing system of claim 6, wherein the controller is further configured to control a second flow rate of the first wash water supplied to the second water sprayer based on the indication of the usable quantity of the first wash water.

8. The food processing system of claim 7, wherein to control the second flow rate, the controller is configured to cause a decrease in the second flow rate when the indication of the usable quantity of the first wash water indicates the usable quantity is less than a threshold.

9. The food processing system of claim 7, wherein to control the second flow rate, the controller is configured to cause an increase in the second flow rate when the indication of the usable quantity of the first wash water indicates the usable quantity is greater than a threshold.

10. The food processing system of claim 7, wherein to control the second flow rate, the controller is configured to control the first pump to change an output flow rate of the first pump.

11. The food processing system of claim 6, further comprising:
    a second wash tank for containing at least a portion of the second wash water, wherein the quantity of the second wash water sprayed by the first water sprayer is taken from the second wash tank and wherein the second wash tank is configured to receive the food product removed from the first wash tank after the food product is sprayed with the quantity of the second wash water by the first water sprayer; and
    a third water sprayer, wherein the third water sprayer is configured to spray a quantity of rinse water on the food product after the food product is removed from the second wash tank, wherein the third water sprayer is configured such that at least a portion of the quantity of the rinse water sprayed by the third water sprayer is configured to enter the second wash tank and become the second wash water, and wherein the controller is further configured to:
obtain an indication of a usable quantity of the second wash water in the second wash tank; and
control a second flow rate of the rinse water supplied to the third water sprayer based on the indication of the usable quantity of the second wash water.

12. The food processing system of claim 11, further comprising a valve configured to adjust the second flow rate of the rinse water to the third water sprayer, wherein to control the second flow rate, the controller is configured to control the valve.

13. A food processing system comprising:
a first wash tank for containing at least a portion of first wash water;
a first water sprayer configured to spray a quantity of second wash water on a food product being removed from the first wash tank, wherein the first water sprayer is configured such that at least a portion of the quantity of the second wash water sprayed by the first water sprayer is configured to enter the first wash tank and become the first wash water;
a controller configured to:
obtain an indication of a quality of the first wash water in the first wash tank; and
control a first flow rate of the second wash water supplied to the first water sprayer, based on the indication.

14. The food processing system of claim 13, wherein to control the first flow rate, the controller is configured to cause an increase in the first flow rate when the indication indicates the quality of the first wash water is less than a first threshold.

15. The food processing system of claim 14, further comprising a valve operable to adjust a flow of water from a water source to the first wash tank, wherein the controller is further configured to open the valve or to increase an opening of the valve when the indication indicates the quality of the first wash water is less than a second threshold, which is less than the first threshold.

16. The food processing system of claim 13, wherein to control the first flow rate, the controller is configured to cause a decrease in the first flow rate when the indication of the quality of the first wash water indicates the quality of the first wash water is greater than a threshold.

17. The food processing system of claim 13, further comprising an optical sensor configured to detect the quality of the first wash water in the first wash tank or coming out of the first wash tank, wherein the controller is configured to obtain the indication of the quality of the first wash water from the optical sensor.

18. The food processing system of claim 17, wherein the optical sensor comprises an ultraviolet (UV) sensor.

19. The food processing system of claim 17, further comprising:
a second water sprayer configured to spray a quantity of the first wash water on the food product prior to the food product being added to the first wash tank; and
a first pump configured to pump the quantity of the first wash water to the second water sprayer, wherein the optical sensor is configured to introduce an optical signal into a pipe coupled between the first pump and the second water sprayer.

20. The food processing system of claim 19, wherein the controller is further configured to control a second flow rate of the first wash water supplied to the second water sprayer based on the indication of the quality.

21. The food processing system of claim 20, wherein to control the second flow rate, the controller is configured to cause an increase in the second flow rate when the indication of the quality of the first wash water indicates the quality is less than a threshold.

22. The food processing system of claim 20, wherein to control the second flow rate, the controller is configured to cause a decrease in the second flow rate when the quality of the first wash water is greater than a threshold.

23. The food processing system of claim 20, wherein to control the second flow rate, the controller is configured to control the first pump to change an output flow rate of the first pump.

24. The food processing system of claim 13, further comprising:
a second wash tank for containing at least a portion of the second wash water, wherein the quantity of the second wash water sprayed by the first water sprayer is configured to be taken from the second wash tank and wherein the second wash tank is configured to receive the food product removed from the first wash tank after the food product is sprayed with the quantity of the second wash water by the first water sprayer; and
a third water sprayer, wherein the third water sprayer is configured to spray a quantity of rinse water on the food product after the food product is removed from the second wash tank, wherein the third water sprayer is configured such that at least a portion of the quantity of the rinse water sprayed by the third water sprayer is configured to enter the second wash tank and become the second wash water, and wherein the controller is further configured to:
obtain an indication of a quality of the second wash water in the second wash tank; and
control a second flow rate of the rinse water supplied to the third water sprayer, based on the indication of the quality of the second wash water.

25. The food processing system of claim 24, further comprising a valve configured to adjust the second flow rate of the rinse water to the third water sprayer, wherein to control the second flow rate, the controller is configured to control the valve.

26. A food processing system comprising:
a wash tank for containing wash water;
a water sprayer configured to spray a quantity of the wash water on a food product;
a water level sensor disposed adjacent to a lateral surface of the wash tank and above an inner bottom surface of the wash tank, wherein the water level sensor is configured to detect a usable quantity of the wash water in the wash tank; and
a controller coupled to the water level sensor and to the water sprayer and configured to:
obtain an indication of the usable quantity of the wash water in the wash tank from the water level sensor; and
control a flow rate of the wash water supplied to the water sprayer, based on the indication.

27. The food processing system of claim 26, further comprising a pump configured to pump the quantity of the wash water to the water sprayer, wherein the water level sensor is positioned in the wash tank at or above a level of an outlet of the wash tank that is coupled to an inlet of the pump.

* * * * *